US011964368B2

(12) United States Patent
Schneider et al.

(10) Patent No.: US 11,964,368 B2
(45) **Date of Patent: *Apr. 23, 2024**

(54) IMPACT TOOL

(71) Applicant: MILWAUKEE ELECTRIC TOOL CORPORATION, Brookfield, WI (US)

(72) Inventors: Jacob P. Schneider, Madison, WI (US); James A. Yaccarino, Greendale, WI (US); Daniel R. Ertl, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,691

(22) Filed: May 2, 2022

(65) Prior Publication Data

US 2022/0250216 A1 Aug. 11, 2022

Related U.S. Application Data

(63) Continuation of application No. 16/278,382, filed on Feb. 18, 2019, now Pat. No. 11,318,589.

(Continued)

(51) Int. Cl.

*B25B 21/02* (2006.01)
*B25B 23/147* (2006.01)

(Continued)

(52) U.S. Cl.

CPC .............. *B25B 21/02* (2013.01); *B25D 11/04* (2013.01); *B25D 11/066* (2013.01);

(Continued)

(58) Field of Classification Search

CPC ....... B25B 21/02; B25B 21/00; B25B 21/026; B25B 23/16; B25B 23/147;

(Continued)

(56) References Cited

U.S. PATENT DOCUMENTS 2,373,664 A * 4/1945 Emery .................... B25B 21/02
173/93.5
2,373,667 A * 4/1945 Emery ................ B25B 23/1405
173/13

(Continued)

FOREIGN PATENT DOCUMENTS

CN 103532179 A 1/2014
CN 203944874 U 11/2014

(Continued)

OTHER PUBLICATIONS

Extended European Search Report for Application No. 19754944.7 dated Oct. 18, 2021 (11 pages).

(Continued)

*Primary Examiner* — Dariush Seif
(74) *Attorney, Agent, or Firm* — Michael Best & Friedrich LLP

(57) ABSTRACT

An impact tool includes a housing that includes a motor housing portion, a front housing portion coupled to the motor housing portion, and a D-shaped handle portion extending from the motor housing portion in a direction opposite the front housing portion. The impact tool includes an electric motor supported in the motor housing portion, a battery pack supported by the housing for providing power to the motor, and a drive assembly for converting a continuous torque input from the motor to consecutive rotational impacts upon a workpiece capable of developing at least 1,700 ft-lbs of fastening torque.

20 Claims, 13 Drawing Sheets

Related U.S. Application Data

(60) Provisional application No. 62/631,986, filed on Feb. 19, 2018.

(51) Int. Cl.
*B25D 11/04* (2006.01)
*B25D 11/06* (2006.01)
*B25D 16/00* (2006.01)

(52) U.S. Cl.
CPC ........ *B25B 23/1475* (2013.01); *B25D 16/006* (2013.01); *B25D 2216/0023* (2013.01)

(58) Field of Classification Search
CPC ............ B25B 23/1475; B25B 23/1453; B25B 23/1405; B25B 19/00; B25D 11/04; B25D 11/066; B25D 16/00; B25D 16/003; B25D 16/006; B25D 2216/0023; B25F 5/026
USPC ........... 173/117, 90, 91, 93, 94, 128; 81/464
See application file for complete search history.

(56) References Cited

U.S. PATENT DOCUMENTS

| | | | | | | |
|---|---|---|---|---|---|---|
| 2,564,224 | A | * | 8/1951 | Mitchell | F16D 43/06 | 81/466 |
| 2,825,436 | A | * | 3/1958 | Amtsberg | B25B 21/026 | 173/93 |
| 2,881,884 | A | * | 4/1959 | Amtsberg | B25B 21/026 | 173/93.6 |
| 2,973,071 | A | * | 2/1961 | Sturrock | B25B 21/026 | 173/93.6 |
| 3,068,973 | A | * | 12/1962 | Maurer | B25B 21/02 | 477/166 |
| 3,070,201 | A | * | 12/1962 | Spyridakis | B25B 21/026 | 173/93 |
| 3,156,334 | A | * | 11/1964 | Hoza | B25B 21/02 | 192/113.1 |
| 3,250,153 | A | * | 5/1966 | Purkey | B25H 1/0057 | 408/100 |
| 3,352,368 | A | * | 11/1967 | Maffey, Jr. | B25B 21/00 | D8/68 |
| 3,362,486 | A | * | 1/1968 | Alajouanine | B25B 23/1453 | 173/93.5 |
| 3,369,615 | A | * | 2/1968 | Maffey, Jr. | B25F 5/02 | 173/93.6 |
| 3,606,931 | A | * | 9/1971 | Karden | B25B 21/026 | 173/93.5 |
| 3,648,784 | A | * | 3/1972 | Schoeps | B25B 21/026 | 173/93.5 |
| 3,759,334 | A | * | 9/1973 | Theurer | B23P 19/06 | 81/464 |
| 3,804,180 | A | * | 4/1974 | Gelfand | B25B 21/02 | 173/15 |
| 4,002,212 | A | * | 1/1977 | Schoeps | B25B 21/02 | 173/93.5 |
| 4,313,505 | A | * | 2/1982 | Silvern | B25B 21/026 | 173/93.5 |
| 4,314,782 | A | * | 2/1982 | Beekenkamp | B25H 1/0078 | D15/138 |
| 4,505,170 | A | * | 3/1985 | Van Laere | B25F 3/00 | 81/464 |
| 4,609,053 | A | * | 9/1986 | Ragnmark | B25D 17/24 | 173/104 |
| 4,619,162 | A | * | 10/1986 | Van Laere | B25F 3/00 | 173/104 |
| 4,719,976 | A | * | 1/1988 | Bleicher | B25D 16/003 | 173/205 |
| 4,905,423 | A | * | 3/1990 | van Laere | B25F 5/001 | 81/464 |
| 5,083,358 | A | * | 1/1992 | Jones | B25B 23/14 | 29/525.11 |
| 5,092,410 | A | * | 3/1992 | Wallace | B25B 21/02 | 81/463 |
| 5,836,403 | A | * | 11/1998 | Putney | B25B 21/02 | 173/205 |
| 5,888,031 | A | * | 3/1999 | Buck | B25F 5/026 | 408/110 |
| 6,104,114 | A | * | 8/2000 | Takeda | H02K 21/16 | 310/90 |
| 6,158,526 | A | * | 12/2000 | Ghode | B25B 21/026 | 173/109 |
| 6,227,308 | B1 | * | 5/2001 | Ghode | B25B 21/02 | 173/93.5 |
| 6,491,111 | B1 | * | 12/2002 | Livingston | B25B 21/02 | 173/93.5 |
| 6,546,815 | B2 | * | 4/2003 | Yamada | B25B 21/02 | 73/862.21 |
| 6,725,945 | B2 | * | 4/2004 | Sugimoto | B25F 5/021 | 173/205 |
| 7,032,685 | B2 | * | 4/2006 | Nakamizo | B25B 23/1453 | 464/37 |
| 7,124,839 | B2 | * | 10/2006 | Furuta | B25B 21/00 | 173/104 |
| 7,131,503 | B2 | * | 11/2006 | Furuta | B25D 16/006 | 173/112 |
| 7,259,486 | B2 | * | 8/2007 | Yamamoto | F04D 29/5806 | 310/90 |
| 7,308,948 | B2 | * | 12/2007 | Furuta | B25B 21/023 | 173/48 |
| 7,416,031 | B2 | * | 8/2008 | Murakami | B25B 21/026 | 173/128 |
| 7,658,239 | B2 | * | 2/2010 | Klemm | B25B 21/00 | 81/473 |
| 7,673,702 | B2 | * | 3/2010 | Johnson | B25B 21/00 | 173/109 |
| 7,823,256 | B2 | * | 11/2010 | Engelfried | B25F 5/026 | 16/426 |
| 7,905,377 | B2 | * | 3/2011 | Krondorfer | B25C 1/06 | 173/90 |
| 7,918,286 | B2 | * | 4/2011 | Nagasaka | B25B 21/02 | 173/109 |
| 7,934,566 | B2 | * | 5/2011 | Hlinka | B25C 1/06 | 173/90 |
| 8,047,057 | B2 | * | 11/2011 | Chen | B25F 5/001 | 173/217 |
| 8,069,929 | B2 | * | 12/2011 | Sugimoto | B25B 21/026 | 81/463 |
| 8,127,974 | B2 | * | 3/2012 | Zhang | B25C 1/06 | 227/129 |
| 8,132,296 | B2 | * | 3/2012 | Di Nicolantonio | B25F 5/026 | 16/426 |
| 8,371,394 | B2 | * | 2/2013 | Grand | B25B 21/02 | 173/29 |
| 8,371,708 | B2 | * | 2/2013 | Nagasaka | B25B 23/18 | 173/217 |
| 8,407,860 | B2 | * | 4/2013 | Brennenstuhl | B25F 5/026 | 16/422 |
| 8,460,153 | B2 | * | 6/2013 | Rudolph | B25F 5/001 | 475/344 |
| 8,490,714 | B2 | * | 7/2013 | Nakamura | B25B 21/00 | 173/93.5 |
| 8,584,770 | B2 | * | 11/2013 | Zhang | B23Q 5/04 | 173/178 |
| 8,631,880 | B2 | * | 1/2014 | Murthy | B25B 21/023 | 173/93.5 |
| 8,827,003 | B2 | * | 9/2014 | Nagasaka | B25B 21/023 | 173/202 |
| 8,925,645 | B2 | * | 1/2015 | Harada | B25B 23/1405 | 173/9 |
| 8,925,646 | B2 | * | 1/2015 | Seith | B25F 5/02 | 173/217 |
| 8,961,358 | B2 | * | 2/2015 | Hirabayashi | B25B 21/008 | 475/300 |
| 9,114,514 | B2 | * | 8/2015 | Leong | B25B 21/00 | |
| 9,114,521 | B2 | * | 8/2015 | Yoshikawa | B25F 5/02 | |
| 9,205,547 | B2 | * | 12/2015 | Hirabayashi | B25B 21/02 | |
| 9,272,400 | B2 | * | 3/2016 | Johnson | B25B 23/1475 | |

(56) References Cited

U.S. PATENT DOCUMENTS 9,308,638 B2 * 4/2016 Kondo ...................... B25F 5/02
9,314,908 B2 * 4/2016 Tanimoto .............. B25B 21/026
9,321,159 B2 * 4/2016 May .................... B25B 23/1475
9,393,711 B2 * 7/2016 Myrhum, Jr. .......... B26D 5/086
9,415,497 B2 * 8/2016 Hecht .................. B25D 16/003
9,463,566 B2 * 10/2016 Yoshikane ............... B25G 1/01
9,566,692 B2 * 2/2017 Seith ....................... B25B 21/02
9,616,558 B2 * 4/2017 Nishikawa .......... B25B 23/1475
9,643,300 B2 * 5/2017 Kumagai ................ B25B 21/02
9,849,577 B2 * 12/2017 Wyler .................. B25D 11/125
9,925,653 B2 * 3/2018 Staas ...................... B25D 16/00
9,975,224 B2 * 5/2018 Tanaka .................... B25B 21/02
10,295,990 B2 * 5/2019 Dey, IV ............ G05B 19/4155
10,654,153 B2 * 5/2020 Murakami .............. B25B 21/02
2001/0004939 A1 * 6/2001 Durmeyer ................. E02D 7/06 173/217
2001/0010268 A1 * 8/2001 Tokunaga ............... B25B 21/02 173/205
2002/0035876 A1 * 3/2002 Donaldson, Jr. ..... B25B 23/1456 73/862.21
2005/0121209 A1 * 6/2005 Shimizu .................. B25B 21/00 173/217
2007/0000676 A1 * 1/2007 Arimura ............. B25B 23/1475 173/179
2007/0209162 A1 * 9/2007 McRoberts ............. B25F 5/026 16/426
2008/0078067 A1 * 4/2008 Nicolantonio .......... B25F 5/026 16/110.1
2008/0099217 A1 * 5/2008 Seith ..................... B25B 21/026 173/1
2009/0133894 A1 * 5/2009 Mizuhara ................ B25F 5/006 310/156.01
2010/0000749 A1 * 1/2010 Andel ................... B25B 21/026 173/202
2010/0005629 A1 * 1/2010 Di Nicolantonio ..... B25F 5/026 16/426
2010/0025063 A1 * 2/2010 Kuhnapfel ............ B25B 21/026 173/203
2010/0078186 A1 * 4/2010 Takeyama ............. B25B 21/026 173/122
2010/0096155 A1 * 4/2010 Iwata ...................... B25B 21/02 173/217
2011/0011609 A1 * 1/2011 Simm ..................... B25F 5/026 173/171
2011/0073334 A1 * 3/2011 Iimura .................... B25B 21/02 173/217
2011/0079407 A1 * 4/2011 Iimura ................ B25B 23/1405 173/217
2011/0188232 A1 * 8/2011 Friedman .................. F21S 9/04 362/119
2011/0315417 A1 * 12/2011 Matsunaga ........... B25B 21/008 173/176
2012/0073846 A1 * 3/2012 Hirai ....................... B25B 21/02 173/200
2012/0199372 A1 * 8/2012 Nishikawa .............. B25B 21/02 173/132
2012/0234566 A1 * 9/2012 Mashiko ................. B25B 21/02 173/93.5
2012/0279736 A1 * 11/2012 Tanimoto .............. B25B 21/026 173/117
2012/0292065 A1 * 11/2012 Hoshi ..................... B25B 21/02 173/93
2012/0292070 A1 * 11/2012 Ito .......................... H02K 11/33 173/217
2012/0318548 A1 * 12/2012 Hirabayashi ............ B25B 21/00 173/93.6
2012/0318549 A1 * 12/2012 Nagasaka ................. B25F 5/02 173/109
2012/0318550 A1 * 12/2012 Tanimoto ............ B25B 23/1475 173/117
2012/0319508 A1 * 12/2012 Oomori ................... B25B 21/02 310/50
2013/0000934 A1 * 1/2013 Tadokoro ................ B25B 21/00 173/90
2013/0008679 A1 * 1/2013 Nishikawa .............. B25B 21/02 173/93
2013/0014967 A1 * 1/2013 Ito ............................. B25F 5/00 173/93
2013/0025892 A1 * 1/2013 Mashiko ............... B25B 21/026 173/2
2013/0062086 A1 * 3/2013 Ito ....................... B25B 23/1475 173/1
2013/0062088 A1 * 3/2013 Mashiko ................. B25B 21/02 173/48
2013/0075121 A1 * 3/2013 Nakamura .............. B25B 21/02 173/94
2013/0087355 A1 * 4/2013 Oomori ................... B25B 21/02 173/94
2013/0126202 A1 * 5/2013 Oomori ................... B25B 21/00 173/217
2013/0133911 A1 * 5/2013 Ishikawa .............. B25D 11/068 173/176
2013/0139614 A1 * 6/2013 Johnson ................ B23P 19/066 73/862.21
2013/0233584 A1 * 9/2013 Mashiko ............. B25B 23/1475 173/181
2013/0270932 A1 * 10/2013 Hatfield ................. H02K 9/227 310/50
2013/0270934 A1 * 10/2013 Smith .................... H02K 3/521 310/50
2013/0333910 A1 * 12/2013 Tanimoto ............ B25B 23/1475 173/176
2014/0008089 A1 * 1/2014 Yeoh ....................... B25B 21/02 173/90
2014/0069672 A1 * 3/2014 Mashiko ................. B25B 21/00 173/47
2014/0124229 A1 * 5/2014 Takahashi ............. B25B 21/026 173/93.5
2014/0131059 A1 * 5/2014 Verbrugge ................ B25F 5/00 173/217
2014/0145524 A1 * 5/2014 Tanimoto ................ B25B 21/02 310/50
2014/0158388 A1 * 6/2014 Johnson ................. B25D 17/06 173/1
2014/0158390 A1 * 6/2014 Mashiko ............... B25B 23/147 173/217
2014/0182869 A1 * 7/2014 Kumagai ................ B25F 5/001 173/93
2014/0224075 A1 * 8/2014 Merrick ................ B25B 13/461 81/52
2014/0251649 A1 * 9/2014 Kondo ..................... B23Q 9/00 16/426
2014/0262398 A1 * 9/2014 Gehret ................. B25D 11/068 173/94
2014/0371018 A1 * 12/2014 Ito ........................... B25F 5/008 475/149
2014/0374130 A1 * 12/2014 Nakamura ............. B25D 11/00 173/176
2015/0000946 A1 * 1/2015 Amend ................. B25B 21/026 173/93
2015/0022125 A1 * 1/2015 Takano ................... H02P 29/68 318/139
2015/0041163 A1 * 2/2015 McClung ................ B25B 21/02 173/176
2015/0041169 A1 * 2/2015 Kumagai ............... B25D 17/26 173/93.7
2015/0047866 A1 * 2/2015 Sakai ...................... B25F 5/001 173/217
2015/0075829 A1 * 3/2015 Seith ....................... B25B 21/02 173/109
2015/0083448 A1 * 3/2015 Chen ................... B25B 23/1475 81/464
2015/0083451 A1 * 3/2015 Nishikawa ........... B25D 16/006 173/48
2015/0096775 A1 * 4/2015 Chen ....................... B25B 21/02 173/1
2015/0144365 A1 * 5/2015 Hirabayashi ........ B25B 23/1405 173/2

(56) References Cited

U.S. PATENT DOCUMENTS

| | | | | |
|---|---|---|---|---|
| 2015/0151415 | A1* | 6/2015 | Saitou | B25F 5/02 173/93 |
| 2015/0158155 | A1* | 6/2015 | Tsubakimoto | B25D 17/11 173/93 |
| 2015/0165604 | A1* | 6/2015 | Bartoszek | B25B 21/02 173/1 |
| 2015/0209952 | A1* | 7/2015 | Nishii | B25F 5/026 173/162.2 |
| 2015/0231770 | A1* | 8/2015 | Kusakawa | B25B 21/02 173/93.5 |
| 2015/0231771 | A1* | 8/2015 | Sakai | B25B 21/02 173/176 |
| 2015/0303842 | A1* | 10/2015 | Takano | H02P 6/30 173/2 |
| 2015/0336249 | A1* | 11/2015 | Iwata | B25B 21/026 173/1 |
| 2015/0343617 | A1* | 12/2015 | Kondo | B25B 21/02 173/93 |
| 2015/0352699 | A1* | 12/2015 | Sakai | B25B 21/026 173/176 |
| 2016/0008961 | A1* | 1/2016 | Takano | B25F 5/00 173/2 |
| 2016/0079887 | A1* | 3/2016 | Takano | H02P 1/028 318/431 |
| 2016/0107297 | A1* | 4/2016 | Ishikawa | B25B 23/18 173/179 |
| 2016/0129568 | A1* | 5/2016 | Nishikawa | B25B 21/026 173/93 |
| 2016/0250743 | A1* | 9/2016 | Kikuchi | B25F 5/02 173/46 |
| 2016/0263731 | A1* | 9/2016 | Matsumoto | B25B 21/02 |
| 2016/0311102 | A1* | 10/2016 | Ebner | H01M 50/247 |
| 2016/0325415 | A1* | 11/2016 | Huber | B25B 23/1475 |
| 2016/0354905 | A1* | 12/2016 | Ely | B25B 21/02 |
| 2017/0021478 | A1* | 1/2017 | Junkers | B25B 23/08 |
| 2017/0028537 | A1* | 2/2017 | McClung | B25B 23/0035 |
| 2017/0036327 | A1* | 2/2017 | Murakami | B25B 21/026 |
| 2017/0057064 | A1* | 3/2017 | Ishikawa | B25B 23/1475 |
| 2017/0144278 | A1* | 5/2017 | Nishikawa | B25B 21/026 |
| 2017/0151657 | A1* | 6/2017 | Nagasaka | B25F 5/02 |
| 2017/0173768 | A1* | 6/2017 | Dey, IV | B25F 5/00 |
| 2017/0190027 | A1* | 7/2017 | Koizumi | H02J 7/345 |
| 2017/0190028 | A1* | 7/2017 | Howard | B25B 21/026 |
| 2017/0190032 | A1* | 7/2017 | Leong | B25F 5/00 |
| 2017/0239801 | A1* | 8/2017 | Kondo | B25B 21/02 |
| 2017/0246732 | A1* | 8/2017 | Dey, IV | G01D 5/2006 |
| 2017/0326712 | A1* | 11/2017 | Li | H02K 1/146 |
| 2017/0326720 | A1* | 11/2017 | Kuroyanagi | B25F 5/021 |
| 2017/0348835 | A1* | 12/2017 | Skelly | B25B 23/0078 |
| 2018/0001444 | A1* | 1/2018 | Matsushita | B25B 23/18 |
| 2018/0117745 | A1* | 5/2018 | Murakami | B25D 11/04 |
| 2018/0200872 | A1* | 7/2018 | Leong | B25B 21/002 |
| 2018/0222022 | A1* | 8/2018 | Kumagai | B25F 5/021 |
| 2019/0028003 | A1* | 1/2019 | Seith | H02K 21/12 |
| 2019/0030692 | A1* | 1/2019 | Harada | B25B 23/1475 |
| 2019/0030696 | A1* | 1/2019 | Seith | B25B 21/02 |
| 2019/0255687 | A1* | 8/2019 | Schneider | B25B 21/02 |
| 2020/0009709 | A1* | 1/2020 | Kumagai | B25B 19/00 |
| 2020/0122281 | A1* | 4/2020 | Wierer | B23Q 11/0092 |
| 2020/0198100 | A1* | 6/2020 | Schneider | B25B 23/16 |
| 2020/0262037 | A1* | 8/2020 | Schneider | B25B 21/026 |

FOREIGN PATENT DOCUMENTS

| | | | |
|---|---|---|---|
| CN | 106112921 | A | 11/2016 |
| EP | 0249037 | B1 | 8/1990 |
| EP | 1036635 | A2 | 9/2000 |
| EP | 2045045 | B1 | 9/2010 |
| EP | 2191941 | B1 | 3/2012 |
| GB | 965516 | A | 7/1964 |
| GB | 2462992 | A | 1/2010 |
| JP | 2003220569 | A | 8/2003 |
| WO | 3092964 | A1 | 11/2003 |
| WO | 2009071376 | A1 | 6/2009 |
| WO | 2009092486 | A1 | 7/2009 |

OTHER PUBLICATIONS

International Search Report and Written Opinion for Application No. PCT/US2019/018403 dated Jun. 5, 2019 (12 pages).

Taiwanese Technical Evaluation for Application No. 108202101 dated Oct. 16, 2023 (10 pages including machine English translation).

Taiwanese Technical Evaluation for Application No. 108202101 dated May 10, 2023 (3 pages including statement of relevance).

* cited by examiner

IMPACT TOOL

CROSS-REFERENCE TO RELATED APPLICATIONS

This application is a continuation of U.S. patent application Ser. No. 16/278,382, filed on Feb. 18, 2019, issued as U.S. Pat. No. 11,318,589, which claims priority to U.S. Provisional Patent Application No. 62/631,986, filed on Feb. 19, 2018, the entire content of each of which is incorporated herein by reference.

FIELD OF THE INVENTION

The present invention relates to power tools, and more specifically to impact tools.

BACKGROUND OF THE INVENTION

Impact tools or wrenches are typically utilized to provide a striking rotational force, or intermittent applications of torque, to a tool element or workpiece (e.g., a fastener) to either tighten or loosen the fastener. As such, impact wrenches are typically used to loosen or remove stuck fasteners (e.g., an automobile lug nut on an axle stud) that are otherwise not removable or very difficult to remove using hand tools.

SUMMARY OF THE INVENTION

The present invention provides, in one aspect, an impact tool including a housing including a motor housing portion, a front housing portion coupled to the motor housing portion, and a D-shaped handle portion extending from the motor housing portion in a direction opposite the front housing portion. The impact tool includes an electric motor supported in the motor housing portion, a battery pack supported by the housing for providing power to the motor, and a drive assembly for converting a continuous torque input from the motor to consecutive rotational impacts upon a workpiece capable of developing at least 1,700 ft-lbs of fastening torque.

The present invention provides, in another aspect, an impact tool including a housing with a motor housing portion, a front housing portion coupled to the motor housing portion, and a first handle portion extending from the motor housing portion, a second handle coupled to the front housing portion, a brushless electric motor supported in the housing, the motor having a nominal diameter of at least 50 mm, a battery pack supported by the housing for providing power to the motor, the battery pack having a nominal voltage of at least 18 Volts, and a drive assembly for converting a continuous torque input from the motor to consecutive rotational impacts upon a workpiece, the drive assembly including an anvil rotatable about an axis and including a head adjacent a distal end of the anvil, the head having a minimum cross-sectional width of at least 1 inch in a plane oriented transverse to the axis, a hammer that is both rotationally and axially movable relative to the anvil for imparting the consecutive rotational impacts upon the anvil, and a spring for biasing the hammer in an axial direction toward the anvil.

The present invention provides, in still another aspect, an impact tool including a housing with a motor housing portion, a front housing portion coupled to the motor housing portion, and a D-shaped handle portion extending from the motor housing portion in a direction opposite the front housing portion, a brushless electric motor supported in the motor housing portion, the motor having a nominal diameter of at least 50 mm and operable at a peak power of at least 950 Watts, a battery pack supported by the housing for providing power to the motor, a second handle coupled to the front housing portion, and a drive assembly for converting a continuous torque input from the motor to consecutive rotational impacts upon a workpiece, the drive assembly including an anvil rotatable about an axis and including a head adjacent a distal end of the anvil, a hammer that is both rotationally and axially movable relative to the anvil for imparting the consecutive rotational impacts upon the anvil, the hammer having a mass of at least 1 kg, and a spring for biasing the hammer in an axial direction toward the anvil.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
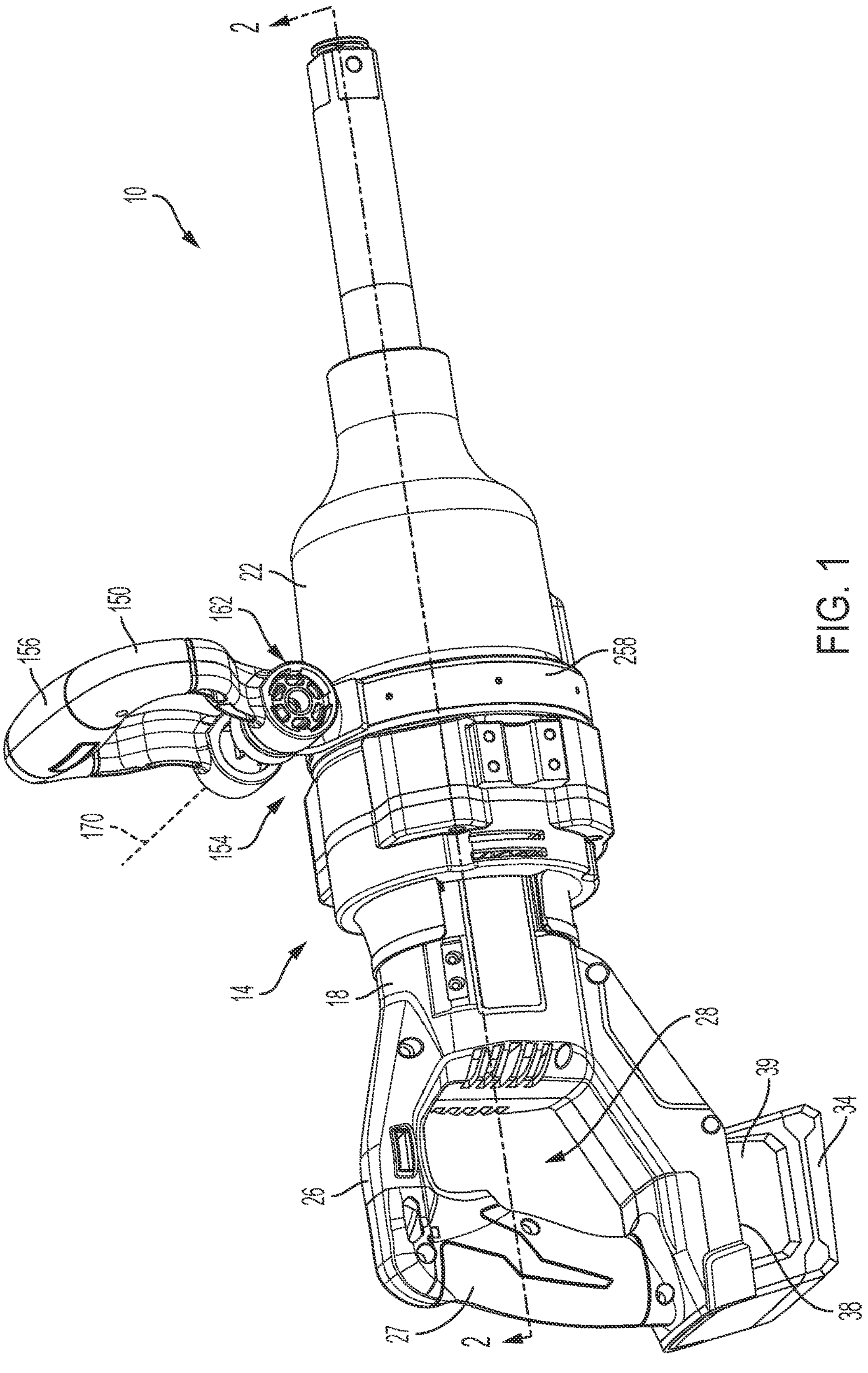
FIG. 1 is a perspective view of an impact wrench according to one embodiment.

FIG. 1 illustrates a power tool in the form of an impact tool or impact wrench 10. The impact wrench 10 includes a housing 14 with a motor housing portion 18, a front housing portion 22 coupled to the motor housing portion 18 (e.g., by a plurality of fasteners), and a generally D-shaped handle portion 26 disposed rearward of the motor housing portion 18. The handle portion 26 includes a grip 27 that can be grasped by a user operating the impact wrench 10. The grip 27 is spaced from the motor housing portion 18 such that an aperture 28 is defined between the grip 27 and the motor housing portion 18. In the illustrated embodiment, the handle portion 26 and the motor housing portion 18 are defined by cooperating clamshell halves, and the front housing portion 22 is a unitary body. In some embodiments, a rubber boot or end cap (not shown) may cover a front end of the front housing portion 22 to provide protection for the front housing portion 22. The rubber boot may be permanently affixed to the front housing portion 22 or removable and replaceable.

With continued reference to FIG. 1, the impact wrench 10 has a battery pack 34 removably coupled to a battery receptacle 38 located at a bottom end of the handle portion 26 (i.e., generally below the grip 27). The battery pack 34 includes a housing 39 enclosing a plurality of battery cells (not shown), which are electrically connected to provide the desired output (e.g., nominal voltage, current capacity, etc.) of the battery pack 34. In some embodiments, each battery cell has a nominal voltage between about 3 Volts (V) and about 5 V. The battery pack 34 preferably has a nominal capacity of at least 5 Amp-hours (Ah) (e.g., with two strings of five series-connected battery cells (a "5S2P" pack)). In some embodiments, the battery pack 34 has a nominal capacity of at least 9 Ah (e.g., with three strings of five series-connected battery cells (a "5S3P pack"). The illustrated battery pack 34 has a nominal output voltage of at least 18 V. The battery pack 34 is rechargeable, and the cells may have a Lithium-based chemistry (e.g., Lithium, Lithium-ion, etc.) or any other suitable chemistry.

Figure 2:
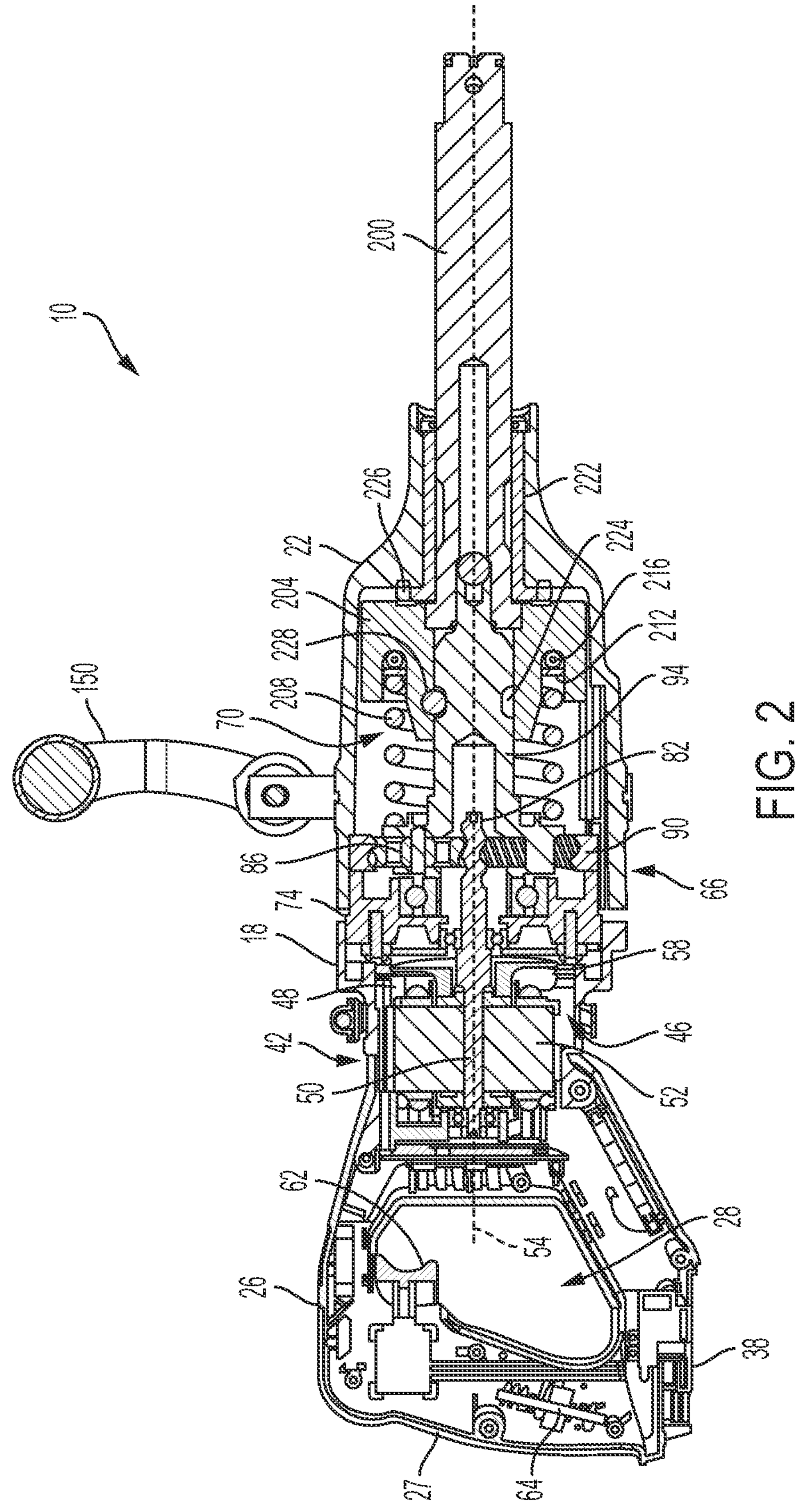
FIG. 2 is a cross-sectional view of the impact wrench of FIG. 1, taken along line 2-2 in FIG. 1.

Referring to FIG. 2, an electric motor 42, supported within the motor housing portion 18, receives power from the battery pack 34 (FIG. 1) when the battery pack 34 is coupled to the battery receptacle 38. The illustrated motor 42 is a brushless direct current ("BLDC") motor with a stator 46 that has a plurality of stator windings 48 (FIG. 2). A rotor or output shaft 50 of the motor 42 has a plurality of permanent magnets 52. In some embodiments, the motor 42 has a nominal diameter of at least 50 mm. In other embodiments, the motor 42 has a nominal diameter of at least 60 mm. In other embodiments, the motor 42 has a nominal diameter of at least 70 mm. In some embodiments, the stator 46 has a stack length of at least 18 mm. In some embodiments, the stator 46 has a stack length of at least 22 mm. In some embodiments, the stator 46 has a stack length of at least 30 mm. In some embodiments, the stator 46 has a stack length of at least 35 mm. For example, in one embodiment, the motor 42 is a BL60-18 motor having a nominal diameter of 60 mm and a stack length of 18 mm. In another embodiment, the motor 42 is a BL60-30 motor having a nominal diameter of 60 mm and a stack length of 30 mm. In another embodiment, the motor 42 is a BL70-35 motor having a nominal diameter of 70 mm and a stack length of 35 mm. Table 1 lists an approximate peak power and efficiency of each of these exemplary motors 42 when paired with a battery pack 34 having a particular capacity. It should be understood that the peak power and efficiency for each of the motors listed in Table 1 may vary (e.g., due to manufacturing and assembly tolerances).

TABLE 1

| Motor | BL60-18 | BL60-30 | BL70-35 |
|---|---|---|---|
| Battery Capacity (Ah) | 5 | 9 | 12 |
| Peak Power (W) | 948.6 | 1410.4 | 1784.4 |
| Peak Efficiency | 80.7% | 84.3% | 85% |

The output shaft 50 is rotatable about an axis 54 relative to the stator 46. A fan 58 is coupled to the output shaft 50 (e.g., via a splined connection) adjacent a front end of the motor 42. The impact wrench 10 also includes a trigger 62 provided on the handle portion 26 that selectively electrically connects the motor 42 and the battery pack 34 to provide DC power to the motor 42. In the illustrated embodiment, a solid state switch 64 carries substantially all of the current from the battery pack 34 to the motor 42. The solid state switch 64 is disposed within the grip 27, generally below the trigger 62.

In other embodiments, the impact wrench 10 may include a power cord for electrically connecting the motor 42 to a source of AC power. As a further alternative, the impact wrench 10 may be configured to operate using a different power source (e.g., a pneumatic power source, etc.). The battery pack 34 is the preferred means for powering the impact wrench 10, however, because a cordless impact wrench advantageously requires less maintenance (e.g., no oiling of air lines or compressor motor) and can be used in locations where compressed air or other power sources are unavailable.

With continued reference to FIG. 2, the impact wrench 10 further includes a gear assembly 66 coupled to the motor output shaft 50 and a drive assembly 70 coupled to an output of the gear assembly 66. The gear assembly 66 is supported within the housing 14 by a gear support 74, which is coupled between the motor housing portion 18 and the front housing portion 22 in the illustrated embodiment. The gear support 74 and the front housing portion 22 collectively define a gear case. The gear assembly 66 may be configured in any of a number of different ways to provide a speed reduction between the output shaft 50 and an input of the drive assembly 70.

Figure 3:
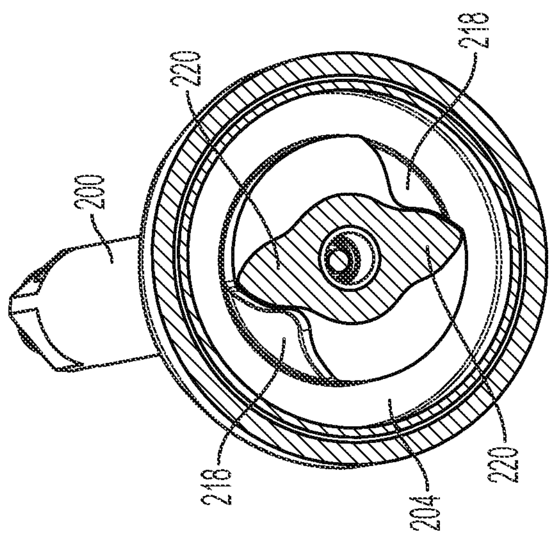
FIG. 3 is a perspective cross-sectional view, illustrating a hammer and an anvil of the impact wrench of FIG. 1.

With reference to FIG. 3, the illustrated gear assembly 66 includes a helical pinion 82 formed on the motor output shaft 50, a plurality of helical planet gears 86 meshed with the helical pinion 82, and a helical ring gear 90 meshed with the planet gears 86 and rotationally fixed within the gear case (e.g., via splines formed in the front housing portion 22 or any other suitable arrangement). The planet gears 86 are mounted on a camshaft 94 of the drive assembly 70 such that the camshaft 94 acts as a planet carrier. Accordingly, rotation of the output shaft 50 rotates the planet gears 86, which then advance along the inner circumference of the ring gear 90 and thereby rotate the camshaft 94. In the illustrated embodiment, the gear assembly 66 provides a gear ratio from the output shaft 50 to the camshaft 94 between 10:1 and 14:1; however, the gear assembly 66 may be configured to provide other gear ratios.

The drive assembly 70 includes an anvil 200, extending from the front housing portion 22, to which a tool element (e.g., a socket; not shown) can be coupled for performing work on a workpiece (e.g., a fastener). The drive assembly 70 is configured to convert the continuous rotational force or torque provided by the motor 42 and gear assembly 66 to a striking rotational force or intermittent applications of torque to the anvil 200 when the reaction torque on the anvil 200 (e.g., due to engagement between the tool element and a fastener being worked upon) exceeds a certain threshold. In the illustrated embodiment of the impact wrench 10, the drive assembly 66 includes the camshaft 94, a hammer 204 supported on and axially slidable relative to the camshaft 94, and the anvil 200.

The drive assembly 70 further includes a spring 208 biasing the hammer 204 toward the front of the impact wrench 10 (i.e., in the right direction of FIG. 3). In other words, the spring 208 biases the hammer 204 in an axial direction toward the anvil 200, along the axis 54. A thrust bearing 212 and a thrust washer 216 are positioned between the spring 208 and the hammer 204. The thrust bearing 212 and the thrust washer 216 allow for the spring 208 and the camshaft 94 to continue to rotate relative to the hammer 204 after each impact strike when lugs 218 on the hammer 204 (FIG. 3) engage with corresponding anvil lugs 220.

The camshaft 94 further includes cam grooves 224 (FIG. 2) in which corresponding cam balls 228 are received. The cam balls 228 are in driving engagement with the hammer 204 and movement of the cam balls 228 within the cam grooves 221 allows for relative axial movement of the hammer 204 along the camshaft 94 when the hammer lugs 218 and the anvil lugs 220 are engaged and the camshaft 94 continues to rotate. A bushing 222 is disposed within the front portion 22 of the housing to rotationally support the anvil 200. A washer 226, which in some embodiments may be an integral flange portion of bushing 222, is located between the anvil 200 and a front end of the front housing portion 22. In some embodiments, multiple washers 226 may be provided as a washer stack.

Figure 4B:
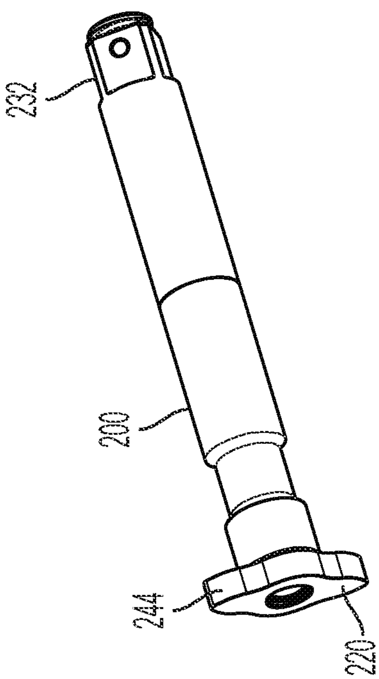
FIG. 4B is another perspective view of the anvil of FIG. 3.
Figure 4A:
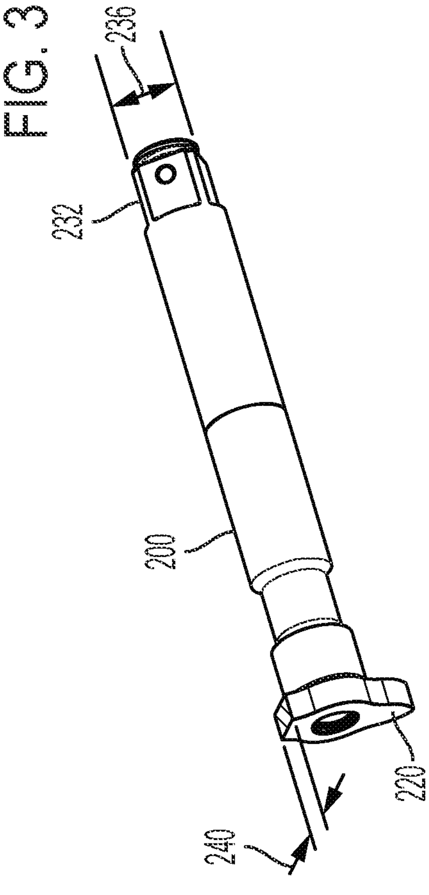
FIG. 4A is a perspective view of the anvil of FIG. 3.
Figure 4C:
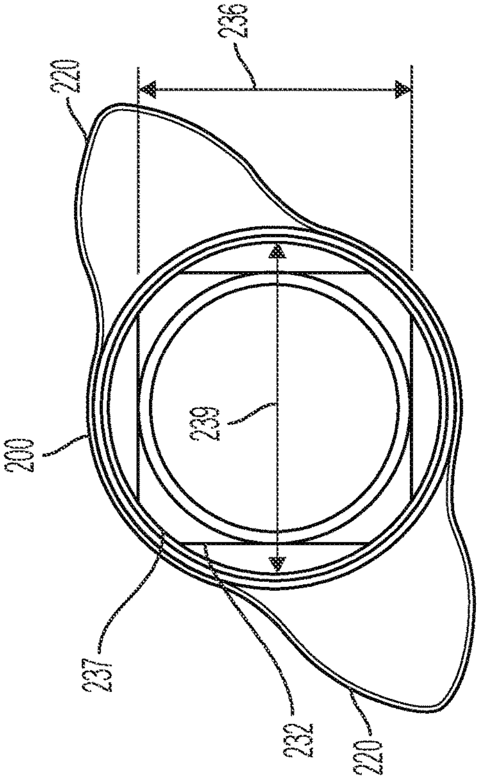
FIG. 4C is a front view of the anvil of FIG. 3.

With reference to FIGS. 4A-C, the illustrated anvil 200 includes a head 232 at its distal end. As illustrated in FIG. 4C, the head 232 has a generally square cross-sectional shape in a plane oriented transverse a rotational axis of the anvil 200 (i.e., the axis 54). The illustrated head 232 has a minimum cross-sectional width 236 of about 1-inch (i.e., a nominal width of 1-inch), such that head 232 can be connected to standard, 1-inch square drive fasteners and tool elements. Measured differently, a circle 237 circumscribing the head 236 has a diameter 239 of about 1.22 inches. In other embodiments, the head 232 may have other nominal widths (e.g., ½ inch, ¾ inch, 1½ inch, etc.). In addition, the head 232 may include other geometries (e.g., hexagonal, spline patterns, and the like).

Each of the illustrated anvil lugs 220 defines a base or cord dimension 240 (FIG. 4A) and a nominal contact area 244 (FIG. 4B) where the hammer lugs 218 contact the anvil lug 220. In the illustrated embodiment, the base dimension 240 is at least 14 mm, and the nominal contact area 244 is at least 260 mm$^2$. The base dimension 240 and the nominal contact area 244 are larger than that of typical impact wrench anvils in order to provide greater strength and higher torque transfer through the anvil 200.

Figure 5B:
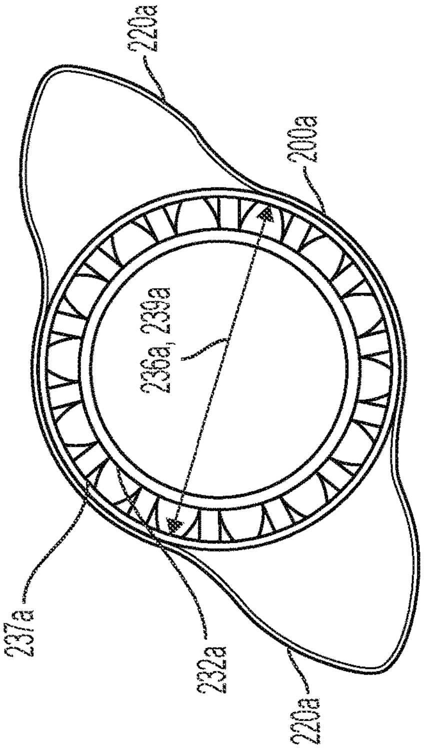
FIG. 5B is a front view of the anvil of FIG. 5A.
Figure 5A:
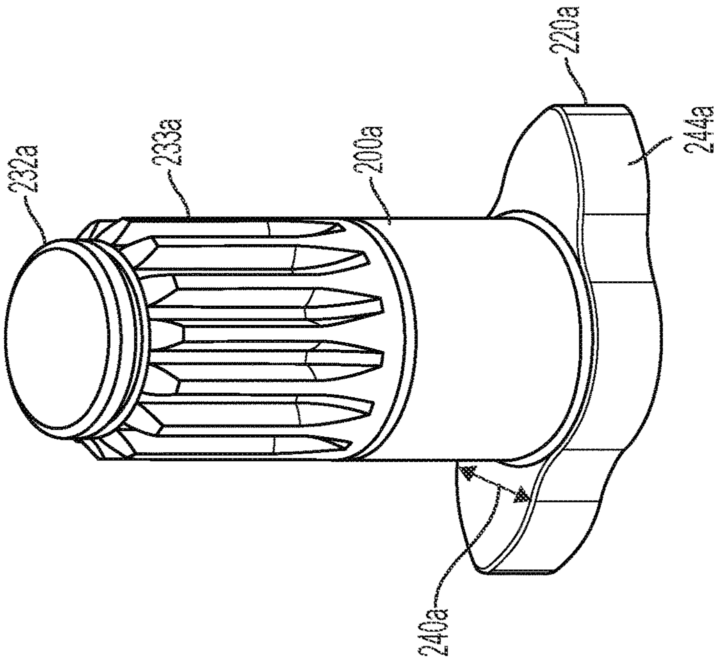
FIG. 5A is a perspective view of an anvil according to another embodiment, usable with the impact wrench of FIG. 1.

In some embodiments, the anvil 200 may be interchangeable with anvils of various lengths and/or head sizes. For example, the illustrated anvil 200 is relatively long and may advantageously provide the impact wrench 10 with longer reach. FIGS. 5A and 5B illustrate an anvil 200*a* according to another embodiment. The anvil 200*a* is shorter in length than the anvil 200. Accordingly, the anvil 200*a* may be used when a more compact length is desired for the impact wrench 10, or to reduce the weight of the impact wrench 10.

The anvil 200*a* includes a head 232*a* with a plurality of axially-extending splines 233*a* that collectively define a spline pattern (FIG. 5A). With reference to FIG. 5B, the illustrated spline pattern is an ASME No. 5 spline pattern, with a cross-sectional width 236*a* of about 1.615 inches (corresponding to a nominal size of 1⅝ inches). As such, the head 232*a* can be connected to standard, ASME No. 5 spline drive fasteners and tool elements. A circle 237*a* circumscribing the head 236*a* has a diameter 239*a* that is equal to the cross-sectional width 236*a*.

The anvil 200*a* includes anvil lugs 220*a*, each defining a base or cord dimension 240*a* and a nominal contact area 244*a* where the hammer lugs 218 contact the anvil lug 220*a*. (FIG. 5A). The base dimension 240*a* may be at least 23 mm, and the contact area 244*a* may be at least 335 mm$^2$.

Thus, in some embodiments, the impact wrench 10 may have an anvil 200, 200*a* with a head 232, 232*a* having a cross-sectional width of at least 1-inch. This relatively large head size may be used for high-torque fastening tasks beyond of the capabilities of typical battery-powered impact tools.

Referring to FIG. 1, the illustrated impact wrench 10 further includes a second handle 150 coupled to a second handle mount 154. The second handle 150 is a generally U-shaped handle with a central grip portion 156, which may be covered by an elastomeric overmold. The second handle mount 154 includes a band clamp 158 that surrounds the front housing portion 22. The second handle mount 154 also includes an adjustment mechanism 162. The adjustment mechanism 162 can be loosened to permit adjustment of the second handle 150. In particular, the second handle 150 is rotatable about an axis 170 when the adjustment mechanism 162 is loosened. In some embodiments, loosening the adjustment mechanism 162 may also loosen the band clamp 158 to permit rotation of the second handle 150 and the second handle mount 154 about the axis 54 (FIG. 2).

In operation of the impact wrench 10, an operator depresses the trigger 62 to activate the motor 42, which continuously drives the gear assembly 66 and the camshaft 94 via the output shaft 50. As the camshaft 94 rotates, the cam balls 228 drive the hammer 204 to co-rotate with the camshaft 94, and the hammer lugs 218 engage, respectively, driven surfaces of the anvil lugs 220 to provide an impact and to rotatably drive the anvil 200 and the tool element. After each impact, the hammer 204 moves or slides rearward along the camshaft 94, away from the anvil 200, so that the hammer lugs disengage the anvil lugs 220. As the hammer 204 moves rearward, the cam balls 228 situated in the respective cam grooves 224 in the camshaft 94 move rearward in the cam grooves 224. The spring 208 stores some of the rearward energy of the hammer 204 to provide a return mechanism for the hammer 204. After the hammer lugs 218 disengage the respective anvil lugs 220, the hammer 204 continues to rotate and moves or slides forwardly, toward the anvil 200, as the spring 208 releases its stored energy, until the drive surfaces of the hammer lugs 218 re-engage the driven surfaces of the anvil lugs 220 to cause another impact.

The impact wrench 10 may be operable in a first mode to deliver two blows or impacts to the anvil 200 per revolution of the camshaft 94 and additionally or alternatively in a second mode to deliver a single blow or impact to the anvil 200 per revolution of the camshaft 94. Components of the impact wrench 10 (e.g., the spring 208, the camshaft 94, and/or the hammer 204) may be replaced or modified to operate the impact wrench 10 in either the first mode or the second mode.

Figure 6:
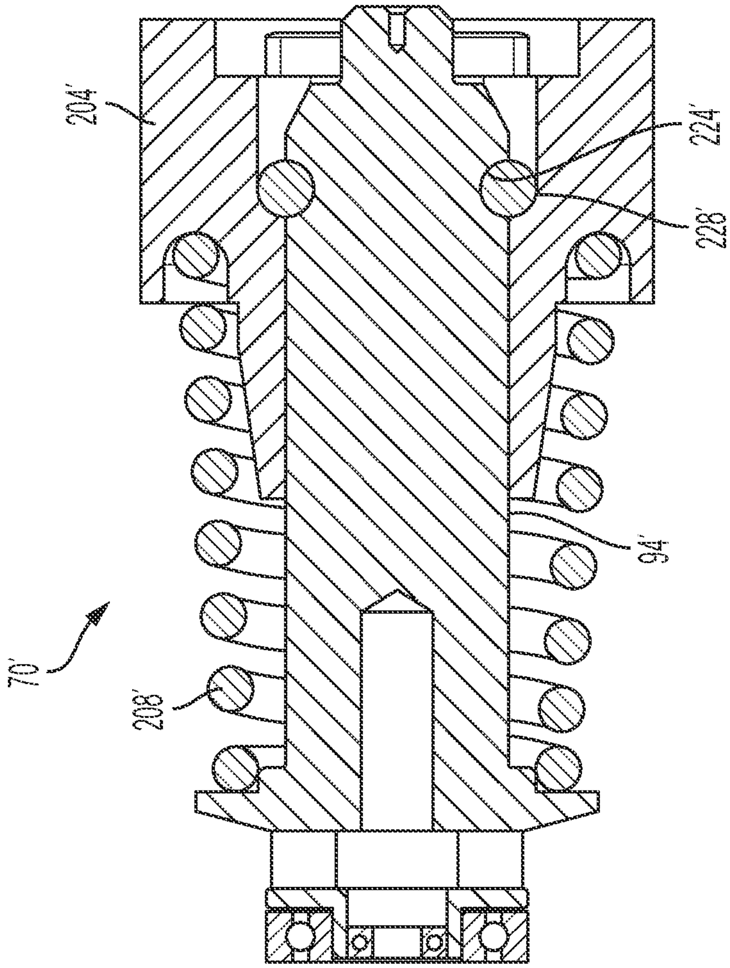
FIG. 6 is a cross-sectional view of a drive assembly according to one embodiment that may be used with the impact wrench of FIG. 1.

For example, FIG. 6 illustrates a drive assembly 70' that may replace the drive assembly 70 to configure the impact wrench 10 for operating in the second mode. The drive assembly 70' includes a camshaft 94' with cam grooves 224' and cam ball 228', a hammer 204', and a spring 208' that may differ in a variety of ways from the components of the drive assembly 70. For example, the camshaft 94' of the assembly 70' is longer than the camshaft 94, and the cam grooves 224' permit greater axial displacement the hammer 204'. The spring 208' is softer to accommodate greater compression due to the increased axial displacement of the hammer 204'. In some embodiments, the hammer 204' is axially displaceable in one direction along the camshaft 94' by a distance of at least 40 millimeters.

Table 2 provides a comparison between various aspects of the drive assembly 70, which can be used to operate the impact wrench 10 in the first mode, and the drive assembly 70', which can be used to operate the impact wrench 10 in the second mode. Optionally, the drive assembly 70' can also be used to operate the impact wrench 10 in the first mode when the motor 42 is operated at a lower speed, as discussed in greater detail below.

TABLE 2

| | Drive Assembly 70 | Drive Assembly 70' |
|---|---|---|
| Impacts per Revolution | 2 | 1 |
| Spring Preload (N) | 860 | 350 |
| Spring Rate (N/mm) | 65 | 32 |
| Spring Preload Length (mm) | 78.93 | 78.93 |
| Spring Wire Diameter (mm) | 6.19 | 6.19 |
| Spring Mean Diameter (mm) | 47.72 | 47.72 |
| Cam Shaft Diameter (mm) | 36 | 36 |
| Cam Angle (deg) | 31.2 | 31.2 |
| Cam Ball Diameter (mm) | 9.525 | 9.525 |
| Hammer Mass (kg) | 1.42 | 1.42 |
| Hammer Moment of Inertia (kg-m2) | 1.41E−03 | 1.41E−03 |
| Hammer Axial Travel (mm) | 23.80 | 48.20 |
| Gear Ratio | 11.4 | 11.4 |

Figure 7:
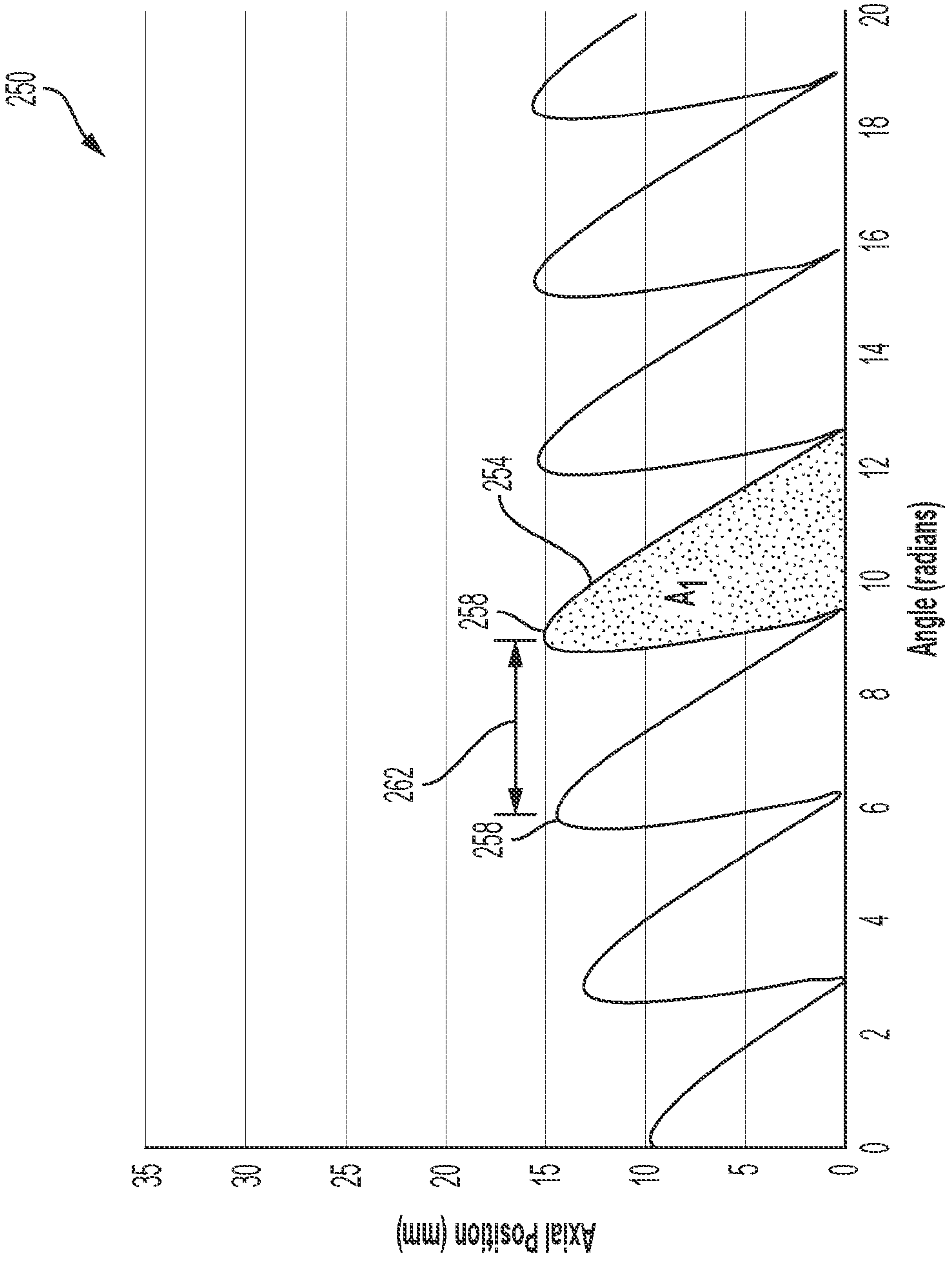
FIG. 7 is an exemplary graph illustrating an axial position of the hammer versus an angular position of the hammer during operation of the impact wrench of FIG. 1 in a first mode.

FIG. 7 is an exemplary graph 250 illustrating operation of the impact wrench 10 in the first mode (i.e., two impacts per revolution). The graph 250 includes a curve 254 representing an axial position of the hammer 204 along the camshaft 94 versus a rotational position of the hammer 204. The curve 254 includes a plurality of peaks 258, each representing the rearmost position of the hammer 204 on the camshaft 94. A period 262 of the curve 254 is defined between adjacent peaks 258. An area $A_1$ under the curve 254 is proportional to the kinetic energy of the hammer 204 when it impacts the anvil 200.

Figure 8:
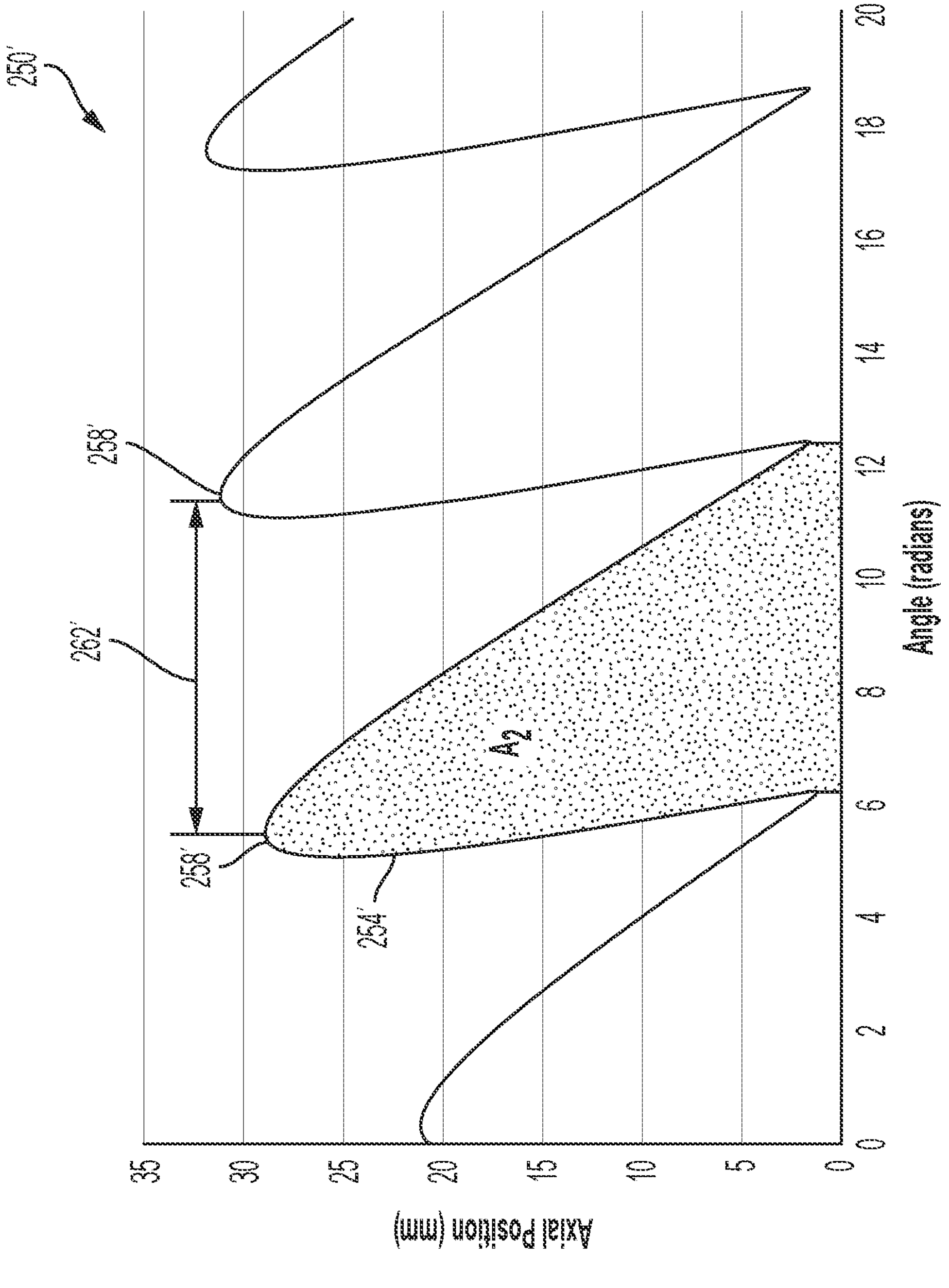
FIG. 8 is an exemplary graph illustrating an axial position of the hammer versus an angular position of the hammer during operation of the impact wrench of FIG. 1 in a second mode.

FIG. 8 is an exemplary graph 250' illustrating operation of the impact wrench 10 in the second mode (i.e., one impact per revolution). The graph 250' includes a curve 254' representing an axial position of the hammer 204' along the camshaft 94' versus a rotational position of the hammer 204'. The curve 254' includes a plurality of peaks 258', each representing the rearmost position of the hammer 204' on the camshaft 94'. A period 262' of the curve 254' is defined between adjacent peaks 258'. An area $A_2$ under the curve 254' is proportional to the kinetic energy of the hammer 204' when it impacts the anvil 200.

It is evident when comparing the graph 250 and the graph 250' that the hammer 204' is displaced a greater axial distance than the hammer 204 before reaching their respective rearmost axial positions. In addition, the area $A_2$ is greater than the area $A_1$, indicating that more kinetic energy is transferred to the anvil 200 per impact in the second mode than in the first mode. Finally, the period 262' is greater than the period 262, indicating that fewer impacts per minute are delivered in the second mode than in the first mode.

Figure 9C:
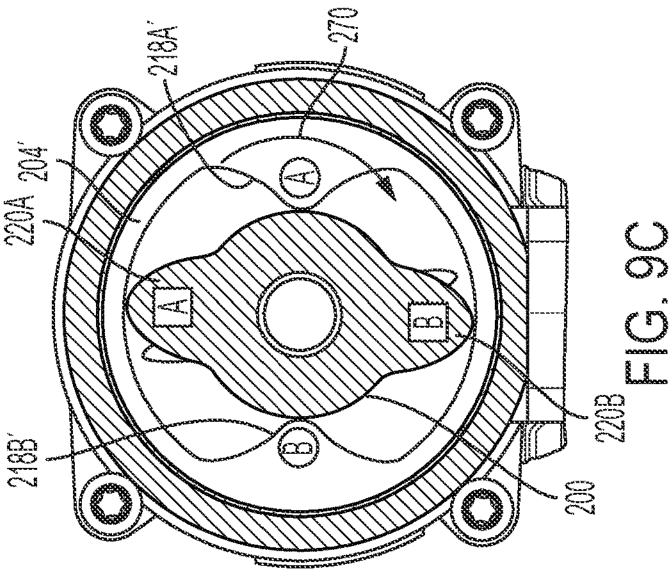
FIGS. 9A-E illustrate operation of the impact wrench of FIG. 1 in the second mode.
Figure 9B:
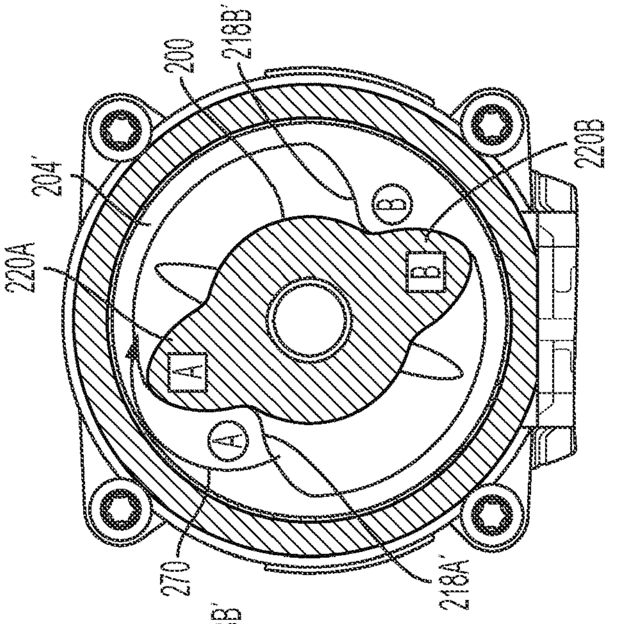
Figure 9A:
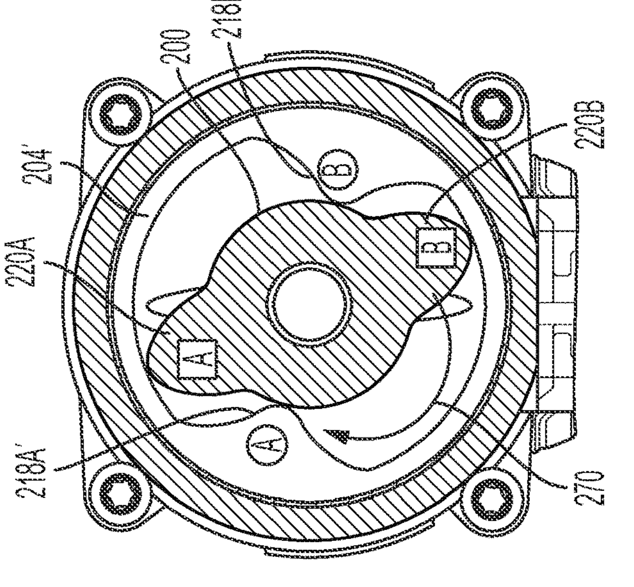

FIGS. 9A-E illustrate operation of the impact wrench 10 in the second mode (i.e., delivering one impact per revolution). The hammer 204' includes first and second hammer lugs 218A', 218B', and the anvil 200 includes first and second anvil lugs 220A, 220B. FIG. 9A illustrates the hammer 204' just prior to the hammer lugs 218A', 218B' impacting the anvil lugs 220A, 220B. The hammer 204' rotates in the direction of arrow 270 while moving toward the anvil 200.

Figure 9E:
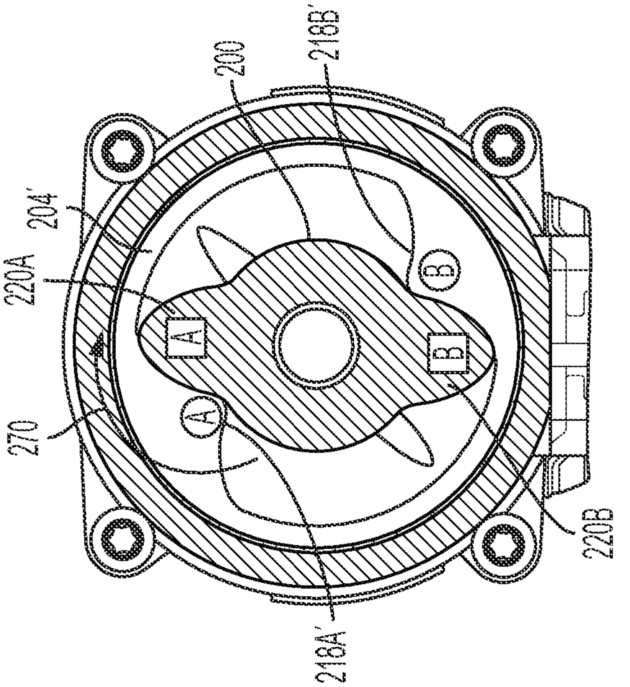
Figure 9D:
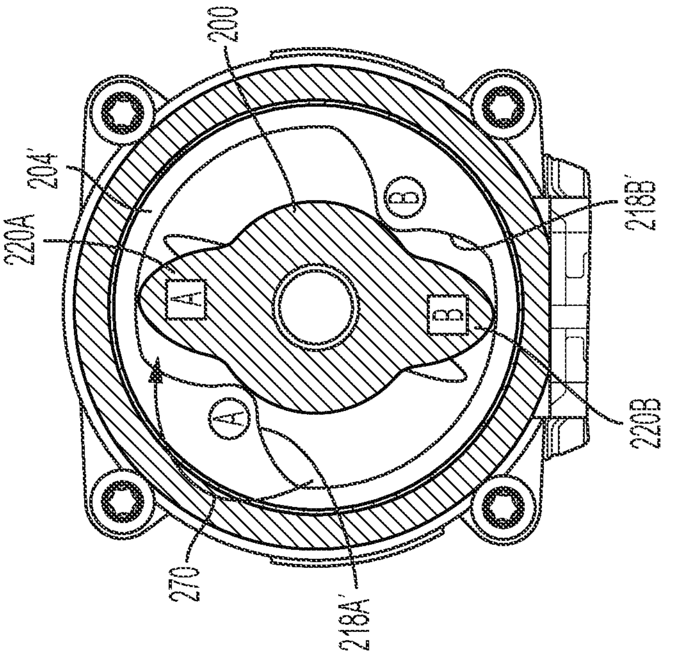

As the hammer 204' reaches its forwardmost axial position, the first hammer lug 218A' impacts the first anvil lug 220A, and the second hammer lug 218B' impacts the second anvil lug 220B, as shown in FIG. 9B. This advances the anvil 200 in the direction of arrow 270. After delivering the impact, the hammer 204' moves away from the anvil 200 along the camshaft 94', and begins to rotate relative to the anvil 200 in the direction of arrow 270 once the hammer lugs 218A', 218B' are clear of the anvil lugs 220A, 220B (FIG. 9C). The motor 42 accelerates the hammer 204', and the hammer 204' completes approximately an entire rotation before impacting the anvil 200 again as shown in FIG. 9E.

The precise amount of rotation of the hammer 204' may vary due to rebound effects. In the illustrated embodiment, the hammer 204' rotates between 345 degrees and 375 degrees between successive impacts. In addition, when operating in the second mode, the first hammer lug 218A' always impacts the first anvil lug 220A, and the second hammer lug 218B' always impacts the second anvil lug 220B.

Table 3 includes experimental results illustrating the fastening torque that the impact wrench 10 is capable of applying to a fastener when operating in the first mode (i.e., delivering two impacts per revolution). As defined herein, the term "fastening torque" means torque applied to a fastener in a direction increasing tension (i.e., in a tightening direction). Table 3 lists the current drawn by the motor 42 and the peak fastening torque exerted on five different 1½ inch bolts over the course of ten seconds. The motor 42 used in these tests was a BL60-30 motor having a nominal diameter of 60 mm and a stator stack length of 30 mm.

TABLE 3

| | Bolt 1 | Bolt 2 | Bolt 3 | Bolt 4 | Bolt 5 |
|---|---|---|---|---|---|
| Current (A) | 78.11 | 78.7 | 79.32 | 77.12 | 77.41 |
| Peak Fastening Torque (ft-lbs) | 2382 | 1982 | 2162 | 2275 | 1877 |

Accordingly, as illustrated by Table 3, the drive assembly 70 of the impact wrench 10 converts the continuous torque input from the motor 52 to deliver consecutive rotational impacts on a workpiece, producing at least 1,700 ft-lbs of fastening torque without exceeding 100 A of current drawn by the motor 42. In some embodiments, the drive assembly 70 delivers consecutive rotational impacts on a workpiece, producing at least 1,700 ft-lbs of fastening torque without exceeding 80 A of current drawn by the motor 42.

In some embodiments, the drive assembly 70 delivers consecutive rotational impacts on a workpiece, producing at least 1,800 ft-lbs of fastening torque without exceeding 100

A of current drawn by the motor 42. In some embodiments, the drive assembly 70 delivers consecutive rotational impacts on a workpiece, producing at least 1,800 ft-lbs of fastening torque without exceeding 80 A of current drawn by the motor 42.

In some embodiments, the drive assembly 70 delivers consecutive rotational impacts on a workpiece, producing at least 1,900 ft-lbs of fastening torque without exceeding 100 A of current drawn by the motor 42. In some embodiments, the drive assembly 70 delivers consecutive rotational impacts on a workpiece, producing at least 1,900 ft-lbs of fastening torque without exceeding 80 A of current drawn by the motor 42.

In some embodiments, the drive assembly 70 delivers consecutive rotational impacts on a workpiece, producing at least 2,000 ft-lbs of fastening torque without exceeding 100 A of current drawn by the motor 42. In some embodiments, the drive assembly 70 delivers consecutive rotational impacts on a workpiece, producing at least 2,000 ft-lbs of fastening torque without exceeding 80 A of current drawn by the motor 42.

The impact wrench 10 can operate at a plurality of different speed settings. In some embodiments, the operating mode of the impact wrench 10 (i.e., the first mode or the second mode) may be dependent upon the speed setting. For example, the drive assembly 70' enables the impact wrench 10 to operate in the second mode when the motor 42 drives the output shaft 50 at a maximum speed and in the first mode when the motor 42 drives the output shaft 50 at a lower speed (e.g., about 60% of the maximum speed). Thus, in some embodiments, a user may toggle between the first mode and the second mode by varying the operating speed of the motor 42.

Table 4 includes simulated performance data for the impact wrench 10 operating in the first mode and in the second mode at the maximum (100%) speed setting. The performance data was simulated for both a BL60-30 motor and a BL70-35 motor. The last column of Table 4 includes simulated performance data for the impact wrench 10 operating in the first mode at a lower (60%) speed setting.

TABLE 4

| | First Mode | Second Mode | First Mode | Second Mode | First Mode |
|---|---|---|---|---|---|
| Drive Assembly | 70 | 70' | 70 | 70' | 70' |
| Motor Speed | 100% | 100% | 100% | 100% | 60% |
| Impacts per Revolution | 2 | 1 | 2 | 1 | 2 |
| Motor | BL60-30 | BL60-30 | BL70-35 | BL70-35 | BL70-35 |
| Battery Capacity (Ah) | 9 | 9 | 9 | 9 | 9 |
| Impacts per Minute | 2134 | 1247 | 1780 | 1082 | 612 |
| Kinetic Energy at Impact (J) | 33.72 | 45.26 | 67.47 | 96.35 | 23.12 |
| Developed Energy over 10 sec (J) | 11,993 | 9,407 | 20,016 | 17,375 | 2,358 |
| Estimated Motor Current (A) | 67-83 | 51-64 | 138-172 | 75-94 | 76-95 |

As illustrated by Table 4, in some embodiments, the hammer 204' of the drive assembly 70' is capable of providing at least 90 J of kinetic energy at impact, or "impact energy" per revolution of the hammer 204' when operating in the second mode. In some embodiments, the hammer 204' is capable of providing at least 90 J of impact energy per revolution of the hammer 204' without exceeding 100 A of current drawn by the motor 42. The impact energy of the hammer 204' in the second mode is significantly greater than the impact energy of the hammer 204 in the first mode. In addition, Table 4 illustrates that the motor 42 may draw less current in the second mode than in the first mode (e.g., approximately 30% less in some embodiments). The second mode may thus be particularly advantageous to overcome static friction when breaking loose stuck fasteners.

Table 5 lists the mass (in kg) and mass-moment of inertia (in kg-$m^2$) for various components of the drive assemblies 70 and 70'.

TABLE 5

| | Moment of Inertia (kg-m2) | Mass (kg) |
|---|---|---|
| Hammer 204 | 4.73E−04 | 0.739 |
| Hammer 204' | 1.41E−03 | 1.423 |
| Cam Shaft 94 | 5.54E−05 | 0.346 |
| Cam Shaft 94' | 5.40E−04 | 1.762 |
| Cam Ball 228 | 1.30E−08 | 0.002 |
| Cam Ball 228' | 4.10E−08 | 0.004 |
| Anvil 200 | 2.65E−04 | 1.753 |
| Anvil 200b | 8.37E−05 | 0.536 |

Figure 11:
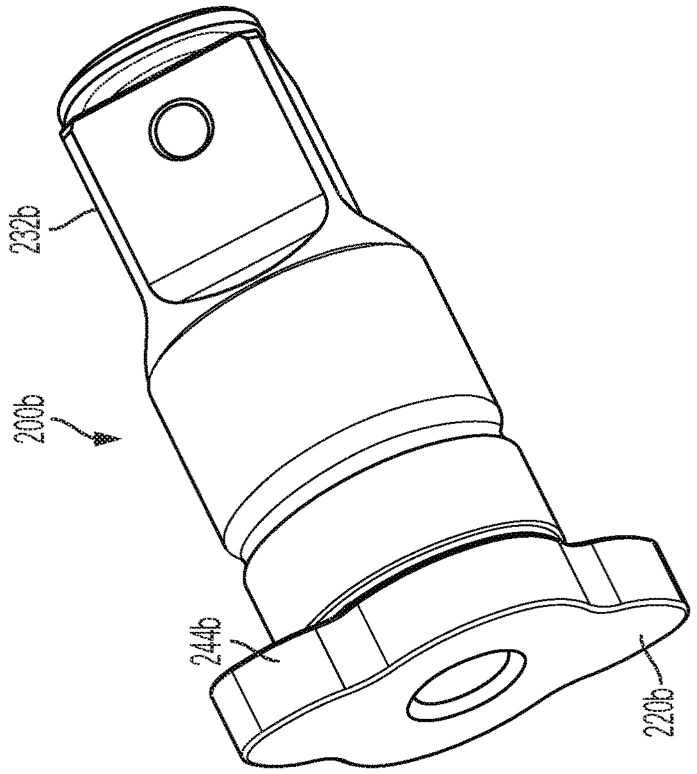
FIG. 11 is another perspective view of the anvil of FIG. 14.
Figure 10:
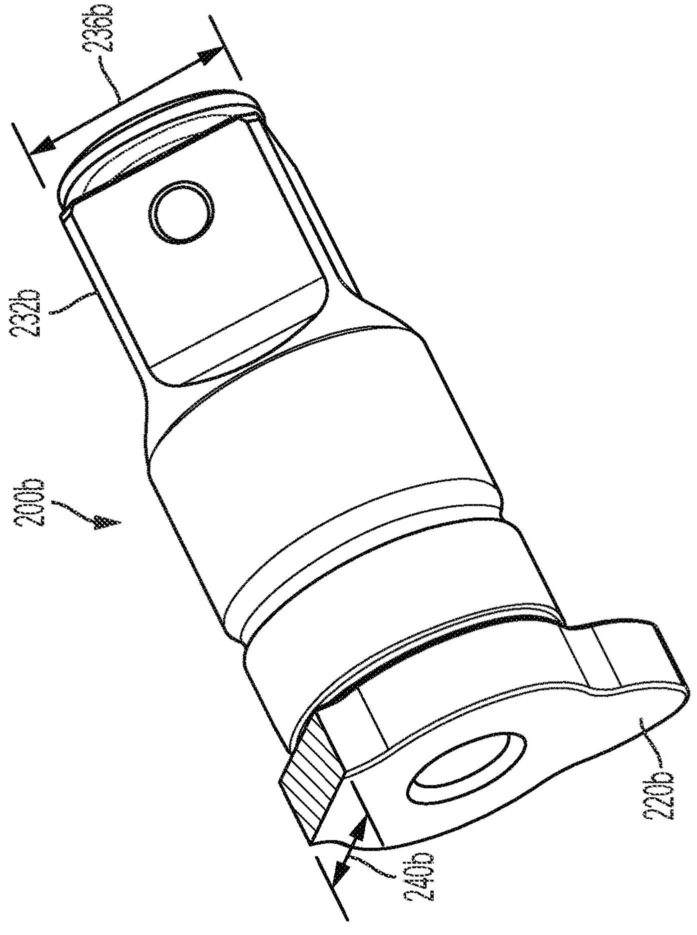
FIG. 10 is a perspective view of an anvil according to another embodiment.

As discussed above with reference to FIGS. 4A-5B, in some embodiments, the anvil 200 may be interchangeable with anvils of various lengths and/or head sizes. FIGS. 10 and 11 illustrate an anvil **200*b* according to another embodiment. The anvil 200*b* is shorter in length than the anvil 200. Accordingly, the anvil 200*b* may be used when a more compact length is desired for the impact wrench 10, or to reduce the weight of the impact wrench 10. The anvil 200*b* includes a head 232*b* defining a nominal width 236*b*. In some embodiments, the nominal width 236*b* is 1 inch. In other embodiments, the anvil 200*b* has a nominal width 236*b* of ¾ inch or ½ inch. As such, the anvil 200*b*** may be configured to accept standard ¾ inch square drive tools elements or ½ inch square drive tool elements, respectively.

The anvil **200*b* includes anvil lugs 220*b*, each defining a base or cord dimension 240*b* and a nominal contact area 244*b* where the hammer lugs 218 contact the anvil lug 220*b*. When the head 232*b* has a nominal width 236*b* of ¾ inch, the base dimension 240*b* may be at least 11 mm, and the contact area 244 may be at least 190 $mm^2$. When the head 232*b* has a nominal width 236 of ½ inch, the base dimension 240 may be at least 11 mm, and the contact area 244** may be at least 150 $mm^2$.

Various embodiments of an impact wrench similar to the impact wrench 10 described above have been developed, including the anvil **200*b***. Table 6 lists various physical and performance characteristics of such impact wrenches.

TABLE 6

| Nominal Head Size (in) | 1/2 | 1/2 | 3/4 |
|---|---|---|---|
| Motor Speed | 100% | 100% | 100% |
| Impacts per Revolution | 2 | 2 | 2 |
| Motor | BL60-22 | BL60-18 | BL60-18 |
| Impacts per Minute | 2369 | 2246 | 2267 |
| Kinetic Energy at Impact (J) | 18.45 | 25.72 | 26.36 |
| Developed Energy over 10 sec (J) | 7285 | 9628 | 9960 |
| Spring Preload (N) | 340 | 520 | 520 |
| Spring Rate (N/mm) | 55 | 65 | 65 |
| Spring Preload Length (mm) | 49.15 | 49.00 | 49.00 |
| Spring Wire Diameter (mm) | 6.00 | 6.19 | 6.19 |
| Spring Mean Diameter (mm) | 42.80 | 43.42 | 43.42 |
| Cam Shaft Diameter (mm) | 20 | 21 | 21 |
| Cam Angle (deg) | 30.5 | 31.2 | 31.2 |

TABLE 6-continued

| Nominal Head Size (in) | 1/2 | 1/2 | 3/4 |
|---|---|---|---|
| Cam Ball Diameter (mm) | 6.35 | 6.60 | 6.60 |
| Hammer Mass (kg) | 0.414 | 0.530 | 0.530 |
| Hammer Moment of Inertia (kg-m2) | 2.44E−04 | 3.39E−04 | 3.39E−04 |
| Gear Ratio | 11.4 | 12.0 | 11.4 |

Figure 12:
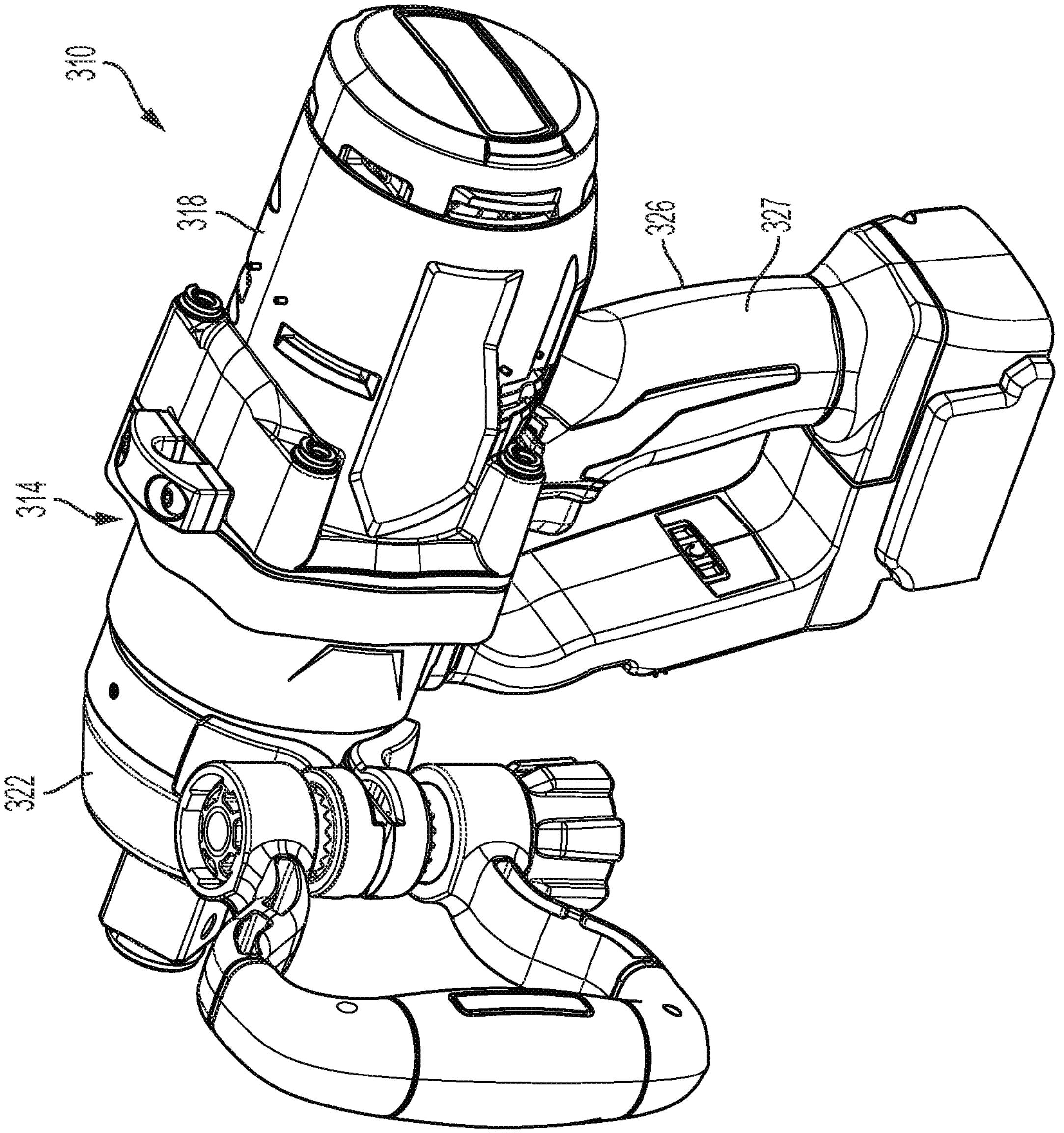
FIG. 12 is a perspective view of an impact wrench according to another embodiment.
Figure 13:
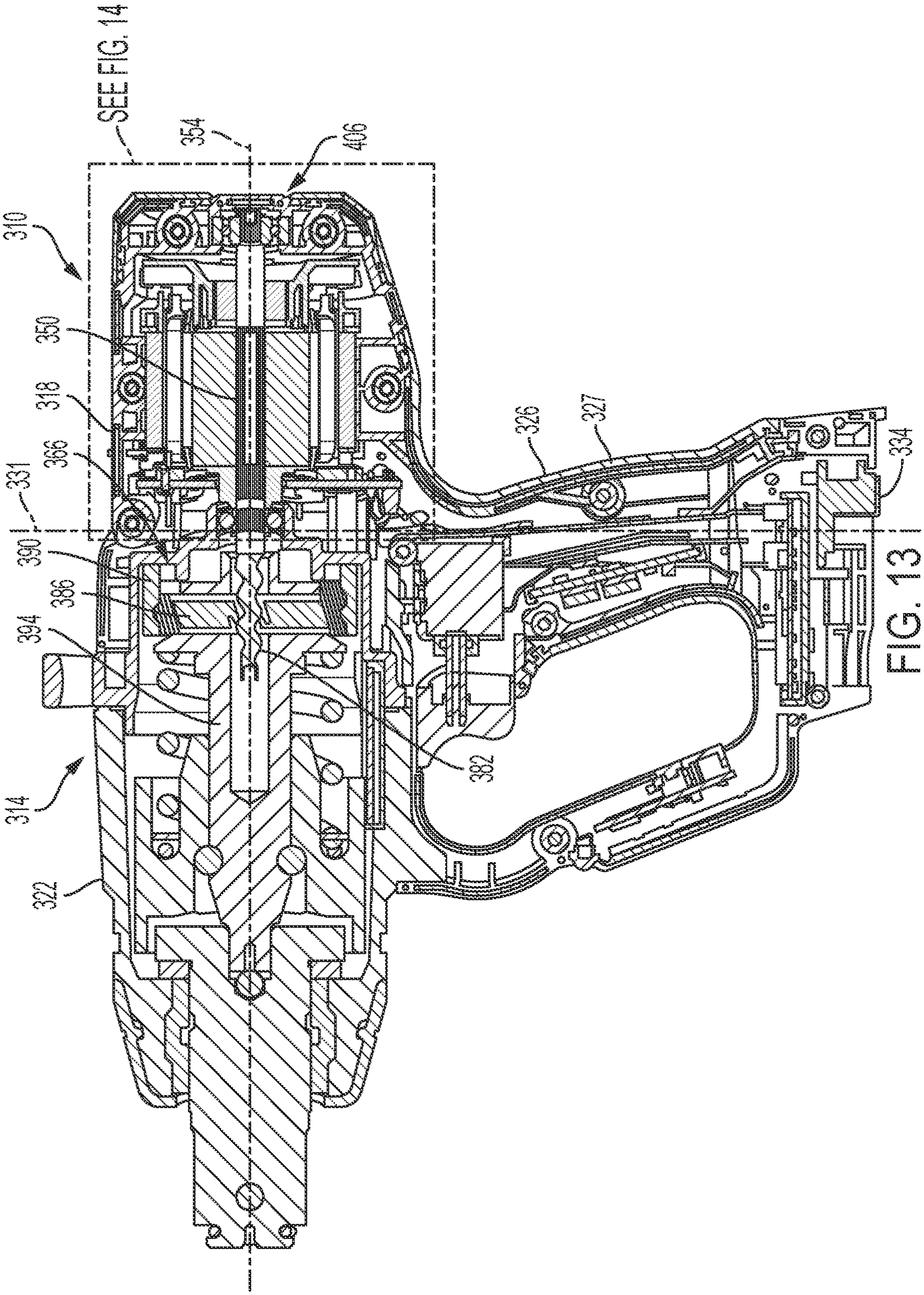
FIG. 13 is a cross-sectional view of the impact wrench of FIG. 12.
Figure 14:
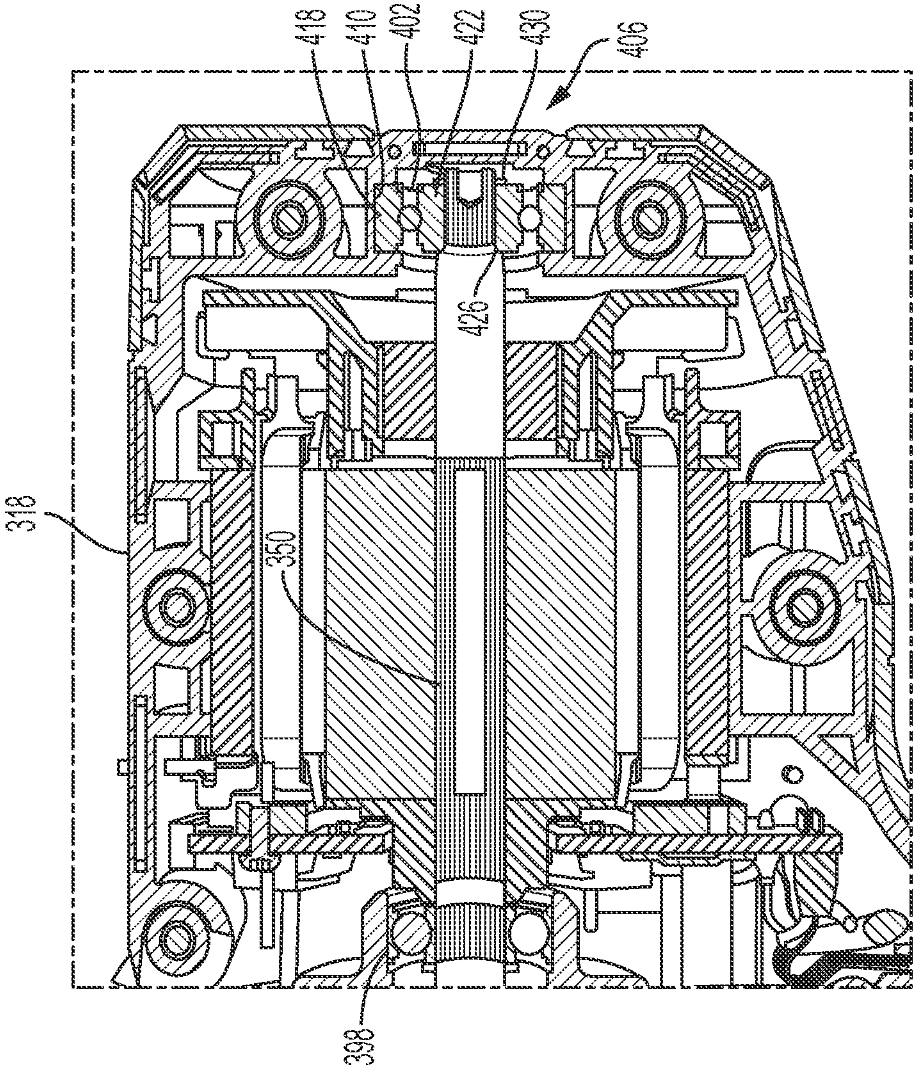
FIG. 14 is an enlarged cross-sectional view of a portion of the impact wrench of FIG. 12.

FIGS. 12-14 illustrate an impact wrench 310 according to another embodiment. The impact wrench 310 is similar to the impact wrench 10 described above, and the following description focuses only on the differences between the impact wrench 310 and the impact wrench 10. In addition, features and elements of the impact wrench 310 corresponding with features and elements of the impact wrench 10 are given like references numbers plus '300.' Finally, it should be understood that features and elements of the impact wrench 310 may be incorporated into the impact wrench 10, and vice versa.

Referring to FIG. 12, the impact wrench 310 has a generally T-shaped configuration that provides a reduced overall tool length compared to the impact wrench 10 of FIG. 1. The impact wrench 310 includes a housing 314 with a motor housing portion 318, a front housing portion 322 coupled to the motor housing portion 318 (e.g., by a plurality of fasteners), and a handle portion 326 extending downward from the motor housing portion 318. The handle portion 326 includes a grip 327 that can be grasped by a user operating the impact wrench 310.

With reference to FIG. 13, the handle portion 326 is positioned such that the camshaft 394 at least partially overlaps the handle portion 326 in a vertical direction (with reference to the orientation of FIG. 13). Put differently, an axis 331 oriented transverse to a rotational axis 354 of the camshaft 394 passes through the handle portion 326 and intersects the camshaft 394. In the illustrated embodiment, the axis 331 also passes through the battery receptacle 334.

The output shaft 350 is rotatably supported by a first or forward bearing 398 and a second or rear bearing 402 (FIG. 14). The helical gears 382, 386, 390 of the gear assembly 366 (FIG. 13) advantageously provide higher torque capacity and quieter operation than spur gears, for example, but the helical engagement between the pinion 382 and the planet gears 386 produces an axial thrust load on the output shaft 350. Accordingly, the impact wrench 310 includes a bearing retainer 406 that secures the rear bearing 402 both axially (i.e., against forces transmitted along the axis 354) and radially (i.e., against forces transmitted in a radial direction of the output shaft 350).

As best illustrated in FIG. 14, the illustrated bearing retainer 406 includes a recess 410 formed adjacent a rear end of the motor housing portion 318. An outer race 418 of the rear bearing 402 is received within the recess 410, which axially and radially secures the outer race 418 to the motor housing portion 318. An inner race 422 of the rear bearing 402 is coupled to the output shaft 350 (e.g., via a press-fit). The inner race 422 is disposed between a shoulder 426 on the output shaft 350 and a snap ring 430 coupled to the output shaft 350 opposite the shoulder 426. The shoulder 426 and the snap ring 430 engage the inner race 422 to axially secure the inner race 422 to the output shaft 350. In some embodiments, the inner race 422 may be omitted, and the output shaft 350 may have a journaled portion acting as the inner race 422.

In operation, the helical engagement between the pinion 382 and the planet gears 386 produces a thrust load along the axis 354 of the output shaft 350, which is transmitted to the rear bearing 402. The bearing 402 is secured against this thrust load by the bearing retainer 406.

Various features of the invention are set forth in the following claims.

What is claimed is:

1. An impact tool comprising:

a housing including a motor housing portion, a front housing portion coupled to the motor housing portion, and a D-shaped handle portion extending from the motor housing portion in a direction opposite the front housing portion;

an electric motor supported in the motor housing portion;

a battery pack supported by the housing for providing power to the motor; and a drive assembly for converting a continuous torque input from the motor to consecutive rotational impacts upon a workpiece capable of developing at least 1,700 ft-lbs of fastening torque.

2. The impact tool of claim 1, wherein the drive assembly includes an anvil rotatable about an axis and including a head adjacent a distal end of the anvil, a hammer that is movable relative to the anvil for imparting the consecutive rotational impacts upon the anvil, and a spring for biasing the hammer in an axial direction toward the anvil.

3. The impact tool of claim 2, wherein the hammer imparts the consecutive rotational impacts upon the anvil at a rate of at least 1 impact per revolution of the hammer.

4. The impact tool of claim 2, wherein the hammer imparts the consecutive rotational impacts upon the anvil at a rate of at least 2 impacts per revolution of the hammer.

5. The impact tool of claim 1, further comprising a second handle coupled to the front housing portion.

6. The impact tool of claim 5, wherein the second handle is rotatably coupled to the front housing portion.

7. The impact tool of claim 5, wherein the second handle is coupled to the front housing portion via a band clamp.

8. An impact tool comprising:

a housing including a motor housing portion, a front housing portion coupled to the motor housing portion, and a first handle portion extending from the motor housing portion;

a second handle coupled to the front housing portion;

a brushless electric motor supported in the housing, the motor having a nominal diameter of at least 50 mm;

a battery pack supported by the housing for providing power to the motor, the battery pack having a nominal voltage of at least 18 Volts; and a drive assembly for converting a continuous torque input from the motor to consecutive rotational impacts upon a workpiece, the drive assembly including an anvil rotatable about an axis and including a head adjacent a distal end of the anvil, the head having a minimum cross-sectional width of at least 1 inch in a plane oriented transverse to the axis, a hammer that is both rotationally and axially movable relative to the anvil for imparting the consecutive rotational impacts upon the anvil, and a spring for biasing the hammer in an axial direction toward the anvil.

9. The impact tool of claim 8, wherein the drive assembly is capable of developing at least 2,000 ft-lbs of fastening torque.

10. The impact tool of claim 9, wherein the first handle portion includes a grip that is spaced from the motor housing portion such that an aperture is defined between the grip and the motor housing portion.

11. The impact tool of claim 10, further comprising a trigger located on the first handle portion.

12. The impact tool of claim 11, wherein the second handle is coupled to the front housing portion via a band clamp.

13. The impact tool of claim 8, wherein the hammer has a mass of at least 1 kg.

14. The impact tool of claim 13, wherein the hammer imparts the consecutive rotational impacts upon the anvil at a rate of 2 impacts per revolution of the hammer.

15. An impact tool comprising:

a housing including a motor housing portion, a front housing portion coupled to the motor housing portion, and a D-shaped handle portion extending from the motor housing portion in a direction opposite the front housing portion;

a brushless electric motor supported in the motor housing portion, the motor having a nominal diameter of at least 50 mm and operable at a peak power of at least 950 Watts;

a battery pack supported by the housing for providing power to the motor;

a second handle coupled to the front housing portion; and a drive assembly for converting a continuous torque input from the motor to consecutive rotational impacts upon a workpiece, the drive assembly including an anvil rotatable about an axis and including a head adjacent a distal end of the anvil, a hammer that is both rotationally and axially movable relative to the anvil for imparting the consecutive rotational impacts upon the anvil, the hammer having a mass of at least 1 kg, and a spring for biasing the hammer in an axial direction toward the anvil.

16. The impact tool of claim 15, wherein the drive assembly is capable of developing at least 1,700 ft-lbs of fastening torque.

17. The impact tool of claim 16, wherein the drive assembly includes a camshaft, and wherein the hammer is axially displaceable along the camshaft.

18. The impact tool of claim 16, wherein the anvil is a first anvil having a first length, and wherein the anvil is interchangeable with a second anvil having a second length different than the first length.

19. The impact tool of claim 15, wherein the hammer includes a first hammer lug and a second hammer lug, wherein the anvil includes a first anvil lug and a second anvil lug, and wherein the drive assembly is configured such that the first hammer lug impacts the first anvil lug, and the second hammer lug impacts the second anvil lug.

20. The impact tool of claim 15, further comprising a planetary transmission configured to provide a speed reduction and torque increase from the motor to the drive assembly, wherein the planetary transmission includes a plurality of planet gears.

* * * * *